(12) United States Patent
Ogawa

(10) Patent No.: US 7,123,648 B2
(45) Date of Patent: Oct. 17, 2006

(54) RADIO RELAY APPARATUS

(75) Inventor: Noboru Ogawa, Kanagawa-ken (JP)

(73) Assignee: Maruko Kogyo Kabushiki Kaisha, Fujisawa (JP)

( * ) Notice: Subject to any disclaimer, the term of this patent is extended or adjusted under 35 U.S.C. 154(b) by 750 days.

(21) Appl. No.: 10/373,786

(22) Filed: Feb. 27, 2003

(65) Prior Publication Data

US 2003/0185287 A1 Oct. 2, 2003

(30) Foreign Application Priority Data

Mar. 29, 2002 (JP) ............................. 2002-094659

(51) Int. Cl.
*H04B 17/02* (2006.01)
*H04B 3/36* (2006.01)
*H04B 7/17* (2006.01)
*H04L 25/20* (2006.01)
*H04L 25/52* (2006.01)

(52) U.S. Cl. .................. 375/211; 178/70; 370/279; 370/293; 370/315; 370/492; 370/501; 379/338

(58) Field of Classification Search ............ 375/211; 455/211; 370/279, 293, 315, 492, 501; 379/338; 178/70

See application file for complete search history.

(56) References Cited

U.S. PATENT DOCUMENTS

| | | | | |
|---|---|---|---|---|
| 5,148,449 A * | 9/1992 | Cannalte et al. ............ 375/318 |
| 5,222,104 A * | 6/1993 | Medendorp ................. 375/308 |
| 5,555,442 A * | 9/1996 | Yoneyama et al. ............ 455/9 |
| 5,682,382 A * | 10/1997 | Shepard ...................... 370/342 |
| 5,781,845 A * | 7/1998 | Dybdal et al. ................ 455/65 |
| 6,438,363 B1 * | 8/2002 | Feder et al. ............. 455/226.4 |
| 6,836,519 B1 * | 12/2004 | Gerlach et al. ............. 375/345 |
| 6,947,445 B1 * | 9/2005 | Barnhart ..................... 370/468 |
| 7,027,530 B1 * | 4/2006 | McFarland et al. ......... 375/341 |
| 2002/0021169 A1 * | 2/2002 | King et al. ................... 330/51 |
| 2002/0061738 A1 * | 5/2002 | Simmons et al. ........ 455/234.1 |
| 2003/0103579 A1 * | 6/2003 | Webster et al. ............. 375/298 |
| 2003/0157894 A1 * | 8/2003 | Han et al. .................. 455/67.1 |

* cited by examiner

*Primary Examiner*—Mohammed Ghayour
*Assistant Examiner*—Erin M. File
(74) *Attorney, Agent, or Firm*—Manabu Kanesaka

(57) ABSTRACT

A radio relay apparatus including an outdoor relay unit formed of first and second receiving parts equipped out of doors and an indoor relay unit formed of third and fourth receiving parts, and a digital transmission line connecting the outdoor and indoor relay units enables radio communication even in a blind area such as an underground area and tunnel. In the first receiving part of the outdoor relay unit, a receiving antenna for receiving a high-frequency signal is integrally incorporated so as eliminate the transmission loss. The high-frequency analog signal is converted to its corresponding digital signal of a desired frequency band by a digital signal processor in the outdoor relay unit, and then, the digital signal thus obtained is transmitted to the indoor relay unit through the digital transmission line, so that high-quality radio communication can be accomplished.

4 Claims, 23 Drawing Sheets

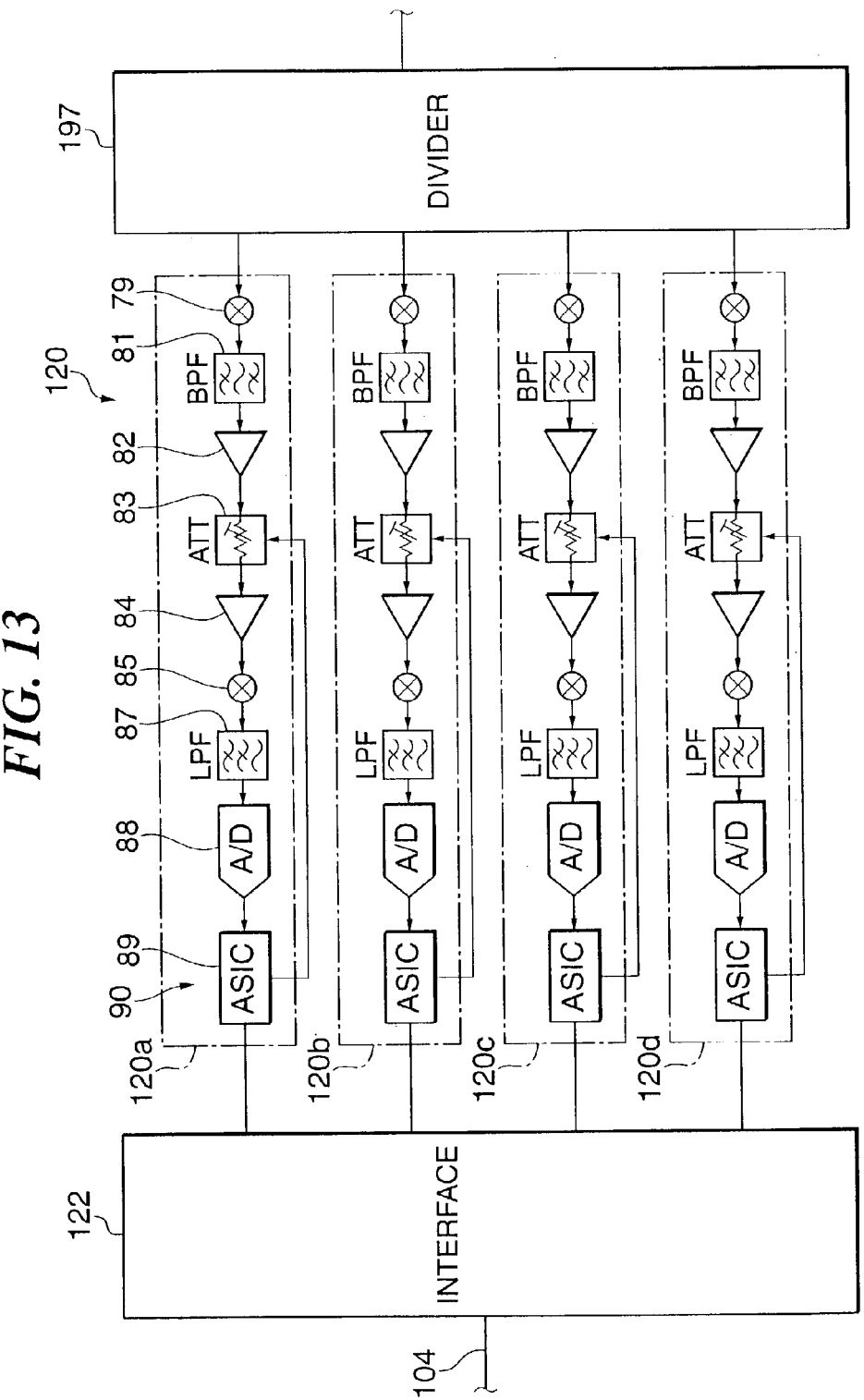

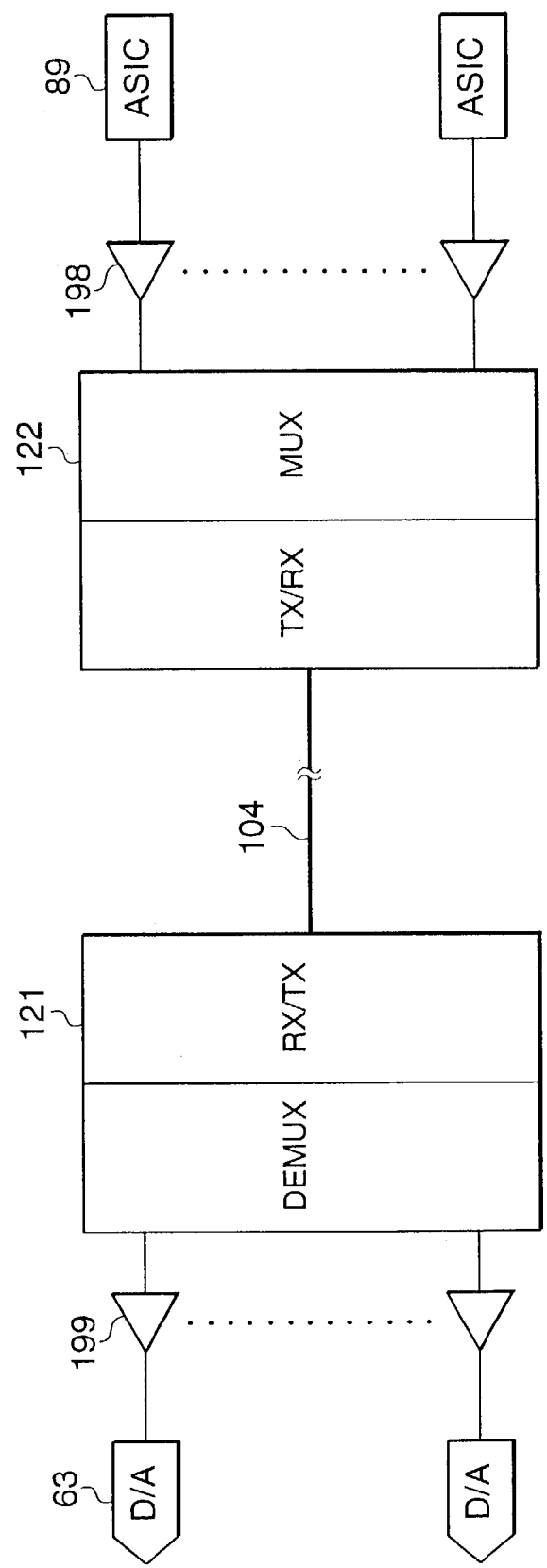

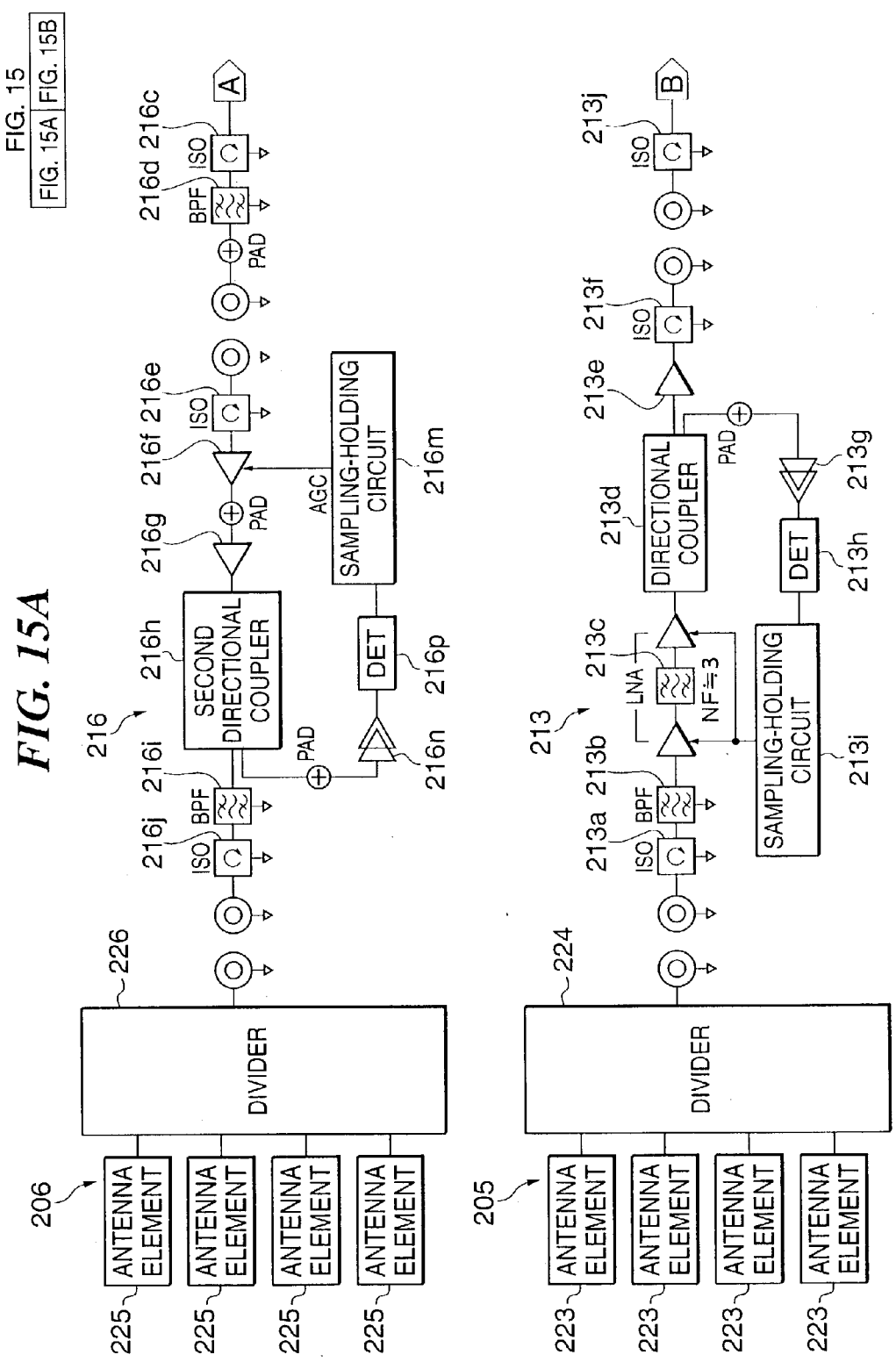

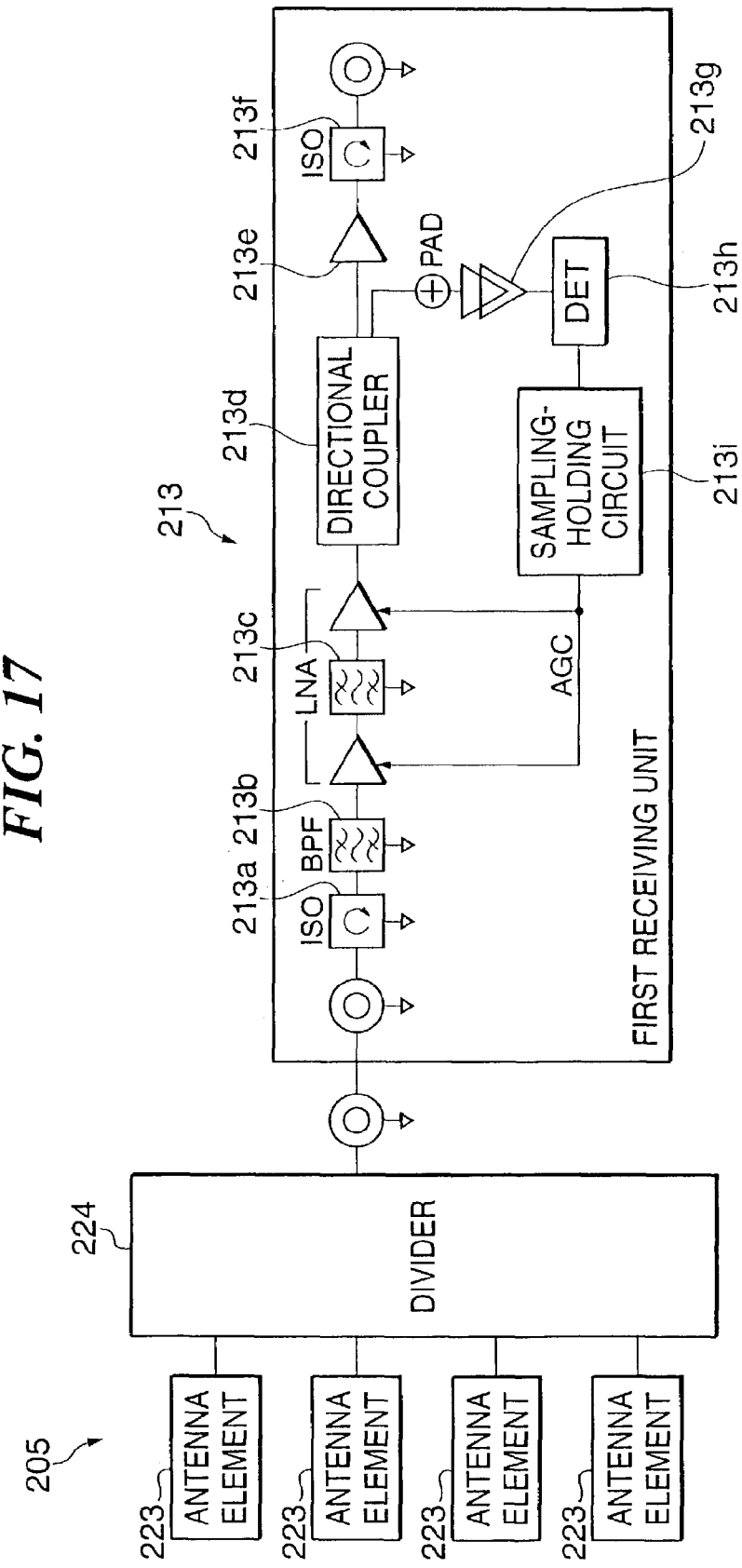

RADIO RELAY APPARATUS

BACKGROUND OF THE INVENTION

1. Field of the Invention

This invention relates to a radio relay apparatus for use in a mobile communication system, and more particularly to a radio relay apparatus for establishing radio communication in a none sensitive area (blind zone) such as an underground area and tunnel, which has difficulty in communicating due to bad radio transmission.

2. Description of the Prior Art

There has been used a radio relay apparatus for allowing communication in a none sensitive area. The radio relay apparatus is connected to an outdoor receiving antenna through a coaxial cable, which is attached to a relay apparatus located in the none sensitive area, so as to transmit a communication signal to the relay apparatus through the coaxial cable.

In general, the coaxial cable connecting the radio relay apparatus to the receiving antenna is as long as over 100 meters in the majority of cases. The long coaxial cable exhibits larger transmission loss, resulting in consuming a large quantity of electric power. Besides, it is not easy to reduce noise figure on a receiving side.

OBJECT OF THE INVENTION

An object of the present invention is to provide a radio relay apparatus capable of increasing transmitting efficiency and decreasing losses caused in transmitting electric power.

Another object of the present invention is to provide a radio relay apparatus capable of reducing noise figure on a receiving side.

Still another object of the present invention is to provide a radio relay apparatus, which can be controlled and handled with ease in establishing communications.

The other object of the present invention is to provide a radio relay apparatus capable of converting a broadband analog signal received out of doors into a corresponding digital signal having a desired frequency band by digitization and transmitting the digital signal to indoors and vice versa with high efficiency.

SUMMARY OF THE INVENTION

To attain the objects described above according to the present invention, there is provided a radio relay apparatus comprising a first relay unit for converting an original broadband analog signal into a digital signal having a desired frequency band and transmitting the digital signal, and a second relay unit placed in a none sensitive area, which receives and converts the digital signal transmitted from the first relay unit through a digital transmission line into an equivalent signal to the original signal.

Where the digital transmission line has a length less than 100 meters, it is desirable to use an electric twist pair cable. In a case of the long-distance digital transmission line, an optical communication system is desired. In particular, digitization for making a conversion to digital signals in the desired band of a cellular mobile telephone system enjoys efficient management of the number of users, reliable control of power supply to the relay system, easy multi-branch multiple access and effective suppression of loop oscillation.

The radio relay apparatus of the invention, which comprises the first and second relay units, is further provided in the first relay unit with a receiver having a comprehensive digital processor for arbitrarily determining the desired band.

The first relay unit having the function of receiving relaying radio waves and sending the received radio waves to a different place is connected with the second relay unit placed in the none sensitive area independent of the first relay unit through the digital transmission line. The first and second relay units each have an antenna incorporated integrally therein, so that the first and second relay units can be connected to the respective antennas without using a cable, consequently to eliminate the transmission loss and improve noise figure and receiving sensitivity.

In the case of a multichannel system adopting many communication bands, the transmission signals are subjected to digital multiplexing in the first relay unit and decoded to be restored to the original signals in the second relay unit equipped on the receiving end. Thus, the information signals given at consigning places can be effectively transmitted to the receiving ends.

The first and second relay units may be connected with each other through a multi-branch multiple access system.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 13 is a block diagram showing an indoor transmitting section of the apparatus in FIG. 9.

FIG. 14 is a block diagram showing a digital transmission line on the transmission side of still another embodiment of the invention.

FIGS. 15A and 15B are block diagrams concretely showing the outdoor relay unit of the invention.

FIG. 17 is a block diagram showing the first receiving unit and receiving antennas in the unit shown in FIG. 15.

DESCRIPTION OF THE PREFERRED EMBODIMENTS

Figure 1:
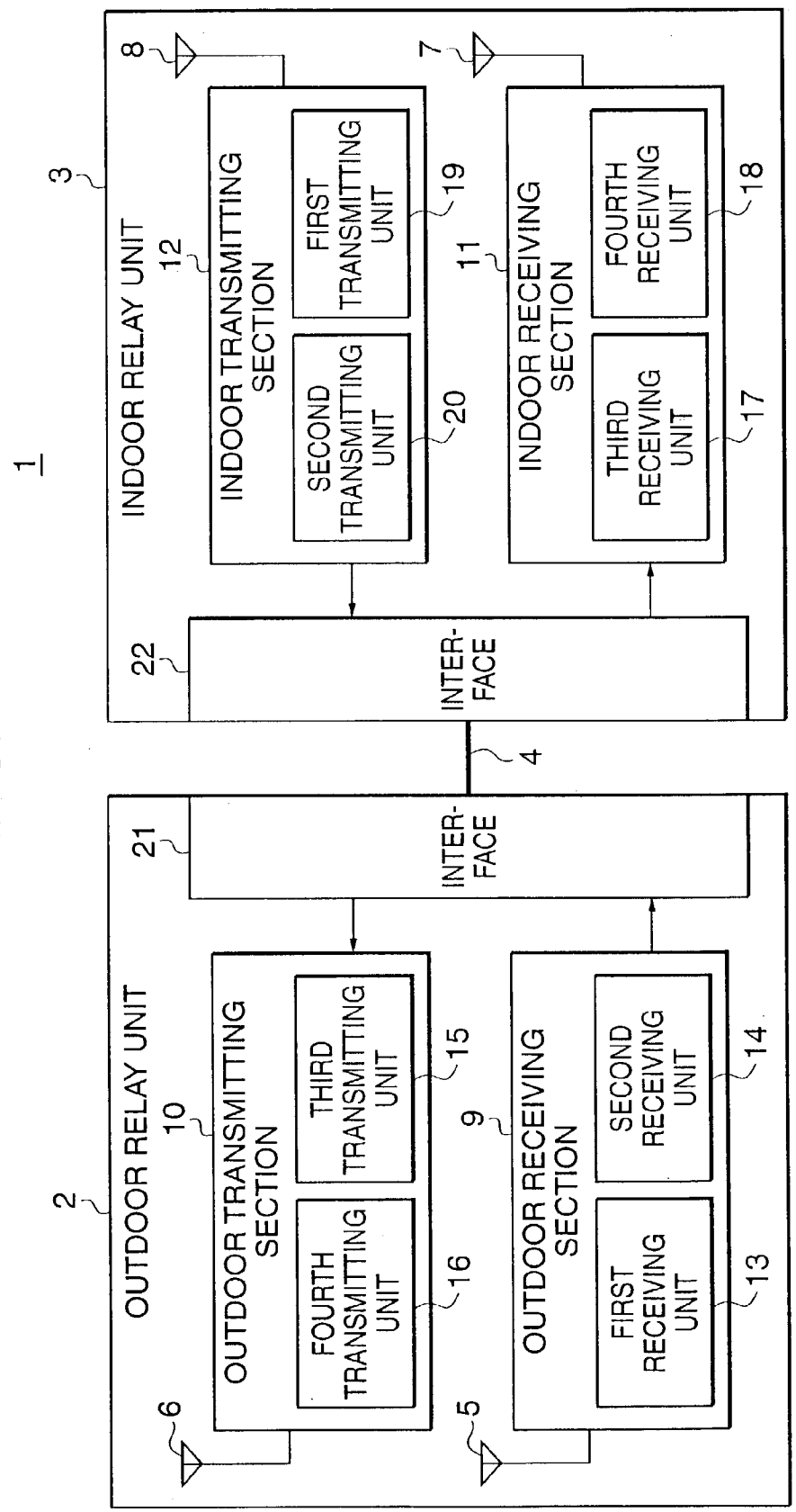
FIG. 1 is a schematic view showing the system configuration of one embodiment of a radio relay apparatus according to the present invention.

A radio relay apparatus 1 illustrated in FIG. 1 according to the present invention is incorporated in a mobile communication system. The radio relay apparatus 1 comprises an outdoor relay unit 2 serving as a first relay unit, an indoor relay unit 3 serving as a second relay unit, and a digital transmission line 4 for connecting the outdoor and indoor relay units 2 and 3 with each other. The outdoor relay unit 2 is equipped out of door and incorporates antennas 5 and 6 for receiving and transmitting carrier waves. The indoor relay unit 3 is equipped in the blind area such as an underground area and tunnel, which hinders the arrival of the carrier waves from a transmission base station. The indoor relay unit 3 incorporates antennas 7 and 8 for receiving the transmitting carrier waves.

The outdoor relay unit 2 is provided with an outdoor receiving section 9 and an outdoor transmitting section 10. The outdoor receiving section 9 includes the antenna 5 for picking up the carrier waves from the base station, and a first receiving unit 13 and a second receiving unit 14 for receiving the transmitting carrier waves picked up by the antenna 5. The outdoor transmitting section 10 includes the transmitting antenna 6 for radiating the carrier waves toward the aforementioned base station, and a third transmitting unit 15 and a fourth transmitting unit 16 for outputting the carrier waves to the antenna 6.

The indoor relay unit 3 is provided with an indoor receiving section 11 and an indoor transmitting section 12. The indoor receiving section 11 includes the transmitting antenna 7 for transmitting the carrier waves toward a mobile station such as a terminal device, e.g. cellular phone, and a third receiving unit 17 and a fourth receiving unit 18 for receiving the carrier waves transmitted through the aforementioned digital transmission line 4. The indoor transmitting section 12 includes the antenna 8 for receiving the carrier waves from the aforementioned mobile station, and a first transmitting unit 19 and a second transmitting unit 20 for transmitting the carrier waves received by the antenna 8 to the digital transmission line 4.

The digital transmission line 4 is connected to interfaces 21 and 22 respectively disposed on the outdoor relay unit 2 and indoor relay unit 3.

The outdoor relay unit 2 will be explained hereinafter with reference to FIGS. 2, 3A and 3B.

Figure 3A:
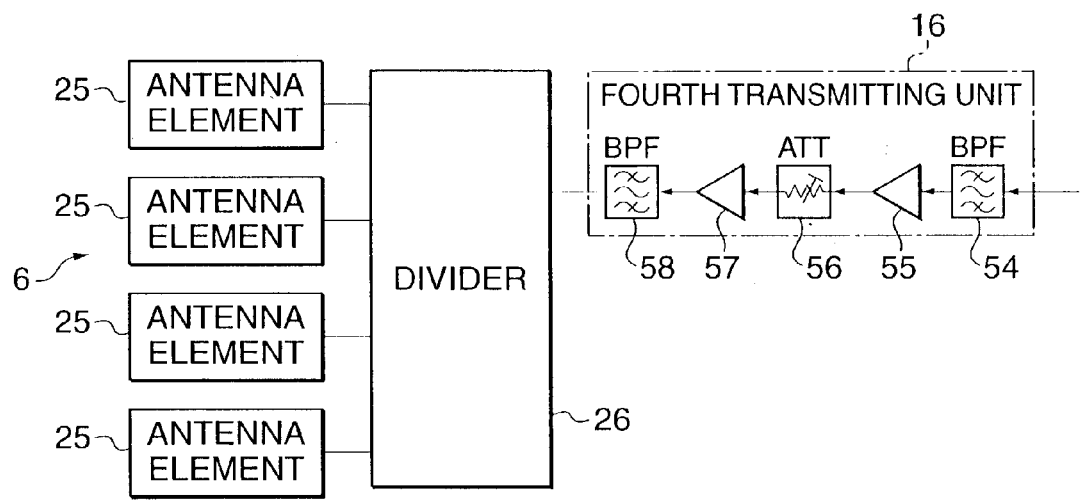
FIGS. 3A and 3B are block diagrams illustrating the relation among receiving antenna elements, a coupler and a first receiving unit, and the relation among transmitting antenna elements, a divider and a fourth transmitting unit.
Figure 3B:
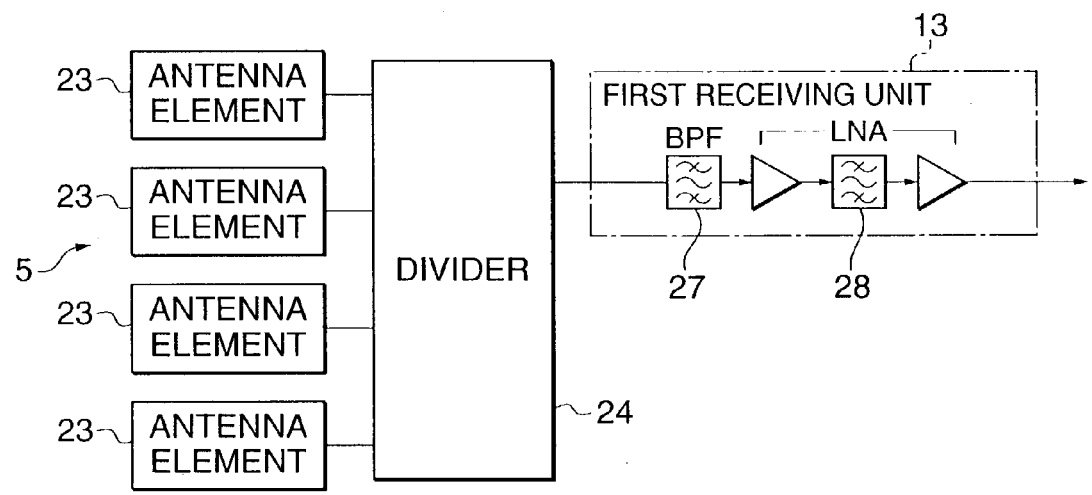

As shown in FIGS. 3A and 3B, the receiving antenna 5 serves to receive the transmitting carrier waves of high frequency band (for example, in the range of 800 MHz, 1500 MHz, etc.) The element 23 of the antenna 5 is united with the first receiving unit 13 of the outdoor receiving section 9 through the intermediary of a divider 24. The transmitting antenna 6 functions to transmit the carrier waves of the prescribed high-frequency band toward the base station. The element 25 of the antenna 6 is united with the fourth receiving unit 16 of the outdoor transmitting section 10 through the intermediary of a divider 26.

Figure 2:
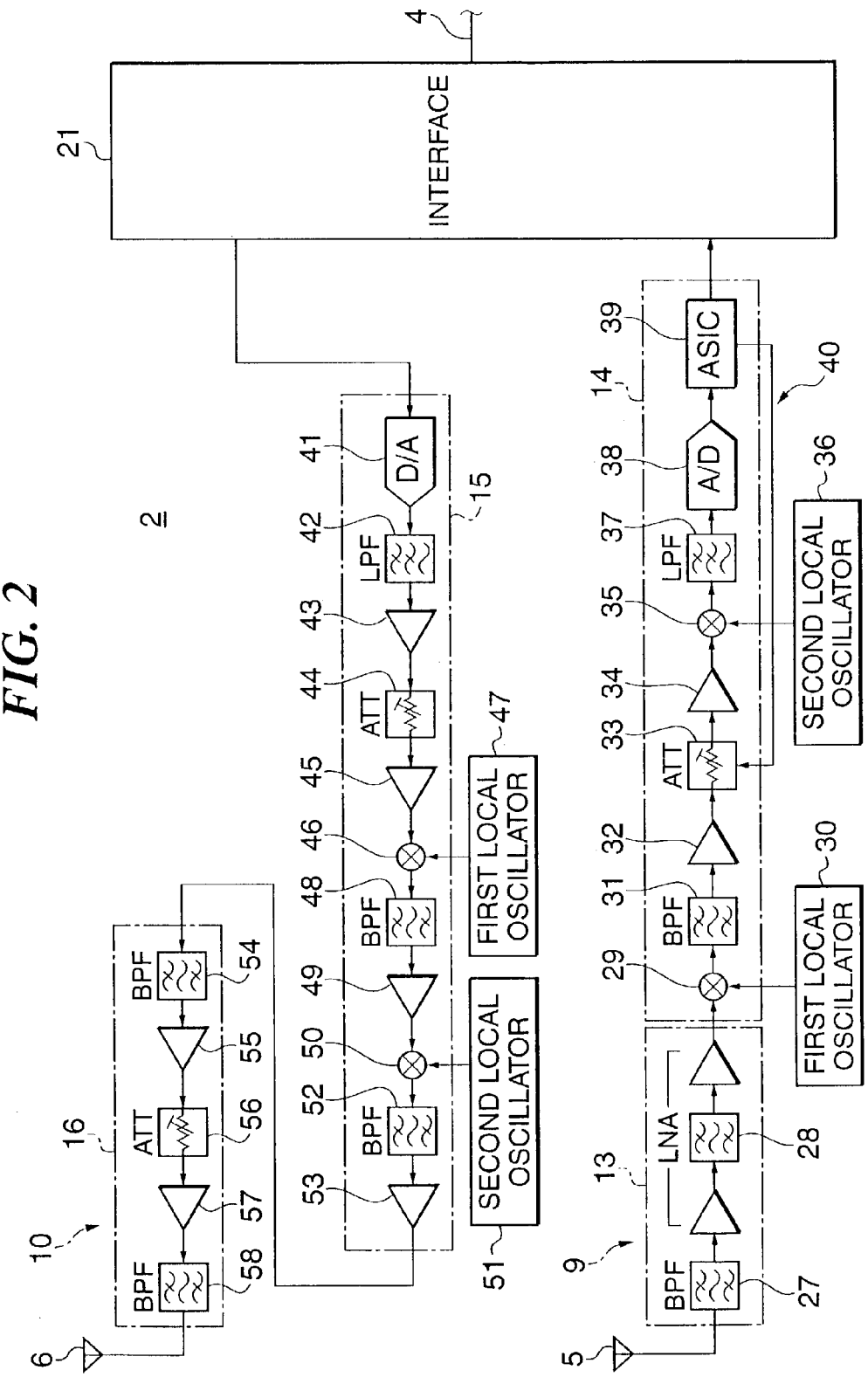
FIG. 2 is a block diagram showing an outdoor relay unit of the radio relay apparatus of the invention.

The first receiving unit 13 in the outdoor receiving section 9 shown in FIGS. 1 and 2 is provided with a first band-pass filter (BPF) 27 and a low-noise amplifier (LNA) 28.

The first band-pass filter 27 serves to discriminate the desired frequency band from the high-frequency band received by the receiving antenna 5. The low-noise amplifier 28 serves to amplify the high-frequency signals having the frequency discriminated by the first band-pass filter 27 with low noise. The first receiving unit 13 is connected to the second receiving unit 14 through the low-noise amplifier 28.

The second receiving unit 14 includes a first frequency mixer 29, a first local oscillator 30, a second band-pass filter (BPF) 31, a first amplifier 32, an attenuator (ATT) 33, a second amplifier 34, a second frequency mixer 35, a second local oscillator 36, a low-pass filter (LPF) 37, an analog-to-digital (A/D) converter 38, and a digital signal processor (application specific IC; ASIC) 39.

The first frequency mixer 29 functions to mix an inputted high-frequency signal with the signal of the prescribed frequency from the first local oscillator 30 to perform frequency conversion for the input signal, and output the converted signal resultantly obtained. As the first local oscillator 30, a phase-locked loop frequency synthesizer may be used by way of example. The second band-pass filter 31 permits only intermediate frequency lower than the discriminated frequency to pass. With the first amplifier 32, the signal having the aforementioned intermediate frequency signal is amplified. The amplified intermediate frequency is attenuated by the attenuator 30, to optimize the desired frequency band level. With the second amplifier 34, the intermediate frequency signal attenuated by the attenuator 30 is amplified. With the second frequency mixer 35 located on the output stage of the second amplifier 34, the intermediate frequency signal inputted is mixed with the prescribed frequency signal from the second local oscillator 36 to perform frequency conversion. Thus, the converted signal resultantly obtained is outputted. The low-pass filter 37 located on the output stage of the second frequency mixer 35 eliminates unnecessary signals having undesirable frequency bands other than the signal having the desired frequency band. A comprehensive digital processor 40 located on the output stage of the low-pass filter 37 comprises the analog-to-digital (A/D) converter 38 and the digital signal processor 39. The A/D converter 38 converts an analog signal outputted from the low-pass filter 37 into the corresponding digital signal. The digital signal inputted to the digital signal processor 39 is outputted to the digital transmission line 4 through the interface 21. The digital signal processor 39 comprises a digital signal processor (DSP) for processing the digital signal inputted and a phase comparator, which are not shown in the drawings. The digital signal processor 39 operates the attenuator 33 in accordance with the field strength, i.e. field intensity, of the received high-frequency signals by means of an automatic gain control, so as to control the gain of the second amplifier 34. As a result, the output directed from the digital signal processor 39 to the interface 21 is kept constant. The digital signal processor 39 has a memory function and may be connected with a computer and/or a display. The digital processing performed by the digital signal processor 39 will be described later.

The third transmitting unit 15 and fourth transmitting unit 16 in the outdoor transmitting section 10 will be explained with reference to FIGS. 1 and 2.

The third transmitting unit 15 includes a digital-to-analog (D/A) converter 41, a low-pass filter (LPF) 42, a first amplifier 43, a first attenuator (ATT) 44, a second amplifier 45, a first frequency mixer 46, a first local oscillator 47, a first band-pass filter (BPF) 48, a third amplifier 49, a second frequency mixer 50, a second local oscillator 51, a second band-pass filter (BPF) 52, and a fourth amplifier 53.

The D/A converter 41 is connected to the interface 21. The D/A converter 41 serves as a decoder for converting inputted digital signals into corresponding analog signals (original signals). The waveform of the signal from the converter 41 is integrated by the low-pass filter 42 connected to the output of the D/A converter 41, thus to eliminate unnecessary out-of-band components of the signal. The first amplifier 43 connected to the output of the low-pass filter 42 amplifies an intermediate frequency signal outputted from the low-pass filter 42. The first attenuator 44 connected to the output of the first amplifier 43 attenuates the intermediate frequency signal amplified by the first amplifier in order to optimize the signal to the desired band level. The second amplifier 45 amplifies the signal thus attenuated by the first attenuator 44. The signal from the second amplifier 45 is mixed with a predetermined frequency signal given by the first local oscillator 47 by the first frequency mixer 46 connected to the output of the second amplifier 45, consequently to output a frequency-converted signal. For instance, a phase-locked loop (PLL) frequency synthesizer may be used as the first local oscillator 47. The first band-pass filter (BPF) 48 connected to the output of the first frequency mixer 46 discriminates only an intermediate frequency signal having lower frequency than that of the converted signal. The third amplifier 49 connected to the output of the first band-pass filter 48 amplifies the intermediate frequency signal thus discriminated. The amplified intermediate frequency signal is mixed with a predetermined frequency signal given by the second local oscillator 51 by the second frequency mixer 50 connected to the output of the third amplifier 49, consequently to output a frequency-converted signal. The second band-pass filter (BPF) 52 connected to the output of the second frequency mixer 50 discriminates just the intermediate frequency signal having lower frequency than that of the signal converted by the second frequency mixer 50. The fourth amplifier 53 connected to the output of the second band-pass filter 52 amplifies the intermediate frequency signal from the second band-pass filter 52.

The fourth transmitting unit 16 includes a third band-pass filter (BPF) 54, a fifth amplifier 55, a second attenuator (ATT) 56, a sixth amplifier 57, and a fourth band-pass filter (BPF) 58. The fourth transmitting unit 16 is connected to the third transmitting unit 15 through the third band-pass filter 54 located on the input side (right side in FIG. 2) and integrally to the transmitting antenna 6 through the fourth band-pass filter 58 located on the output side. The third band-pass filter 54 discriminates the intermediate frequency signal outputted from the fourth amplifier 53. The fifth amplifier 55 amplifies the intermediate frequency signal thus discriminated by the third band-pass filter 54. The second attenuator 56 attenuates the intermediate frequency signal in order to optimize the desired band level. The sixth amplifier 57 is a power amplifier (PA) for amplifying the intermediate frequency signal attenuated by the second attenuator 56. As the power amplifier, a radio frequency (RF) power module may be used. The fourth band-pass filter 58 connected to the output of the sixth amplifier 57 derives just the signal having the desired frequency band from the intermediate frequency signal inputted thereto, and then, output the desired signal thus derived to the transmitting antenna 6. Consequently, a specific high-frequency signal is radiated toward the base station from the antenna 6.

Next, the indoor relay unit 3 will be described hereinafter with reference to FIGS. 1, 4, 5A and 5B.

The indoor relay unit 3 includes the indoor receiving section 11 and the indoor transmitting section 12. The indoor receiving section 11 is composed of the third receiving unit 17 and fourth receiving unit 18, which receive the carrier waves transmitted through the aforementioned digital transmission line 4, and the antenna 7 for radiating the carrier waves toward the mobile station. The indoor transmitting section 12 is composed of the antenna 8 for receiving the carrier waves from the aforementioned mobile station, and the first transmitting unit 19 and second transmitting unit 20 for transmitting the carrier waves received by the antenna 8 to the aforementioned digital transmission line 4.

Figure 5A:
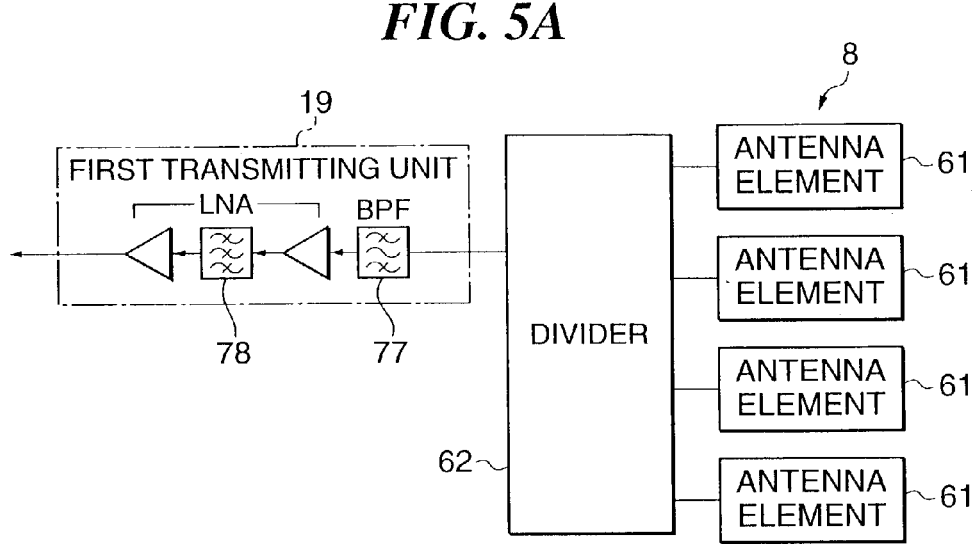
FIGS. 5A and 5B are block diagrams illustrating the relation among the transmitting antenna elements, divider and fourth transmitting unit, and the relation among the receiving antenna elements, coupler and first receiving unit.
Figure 5B:
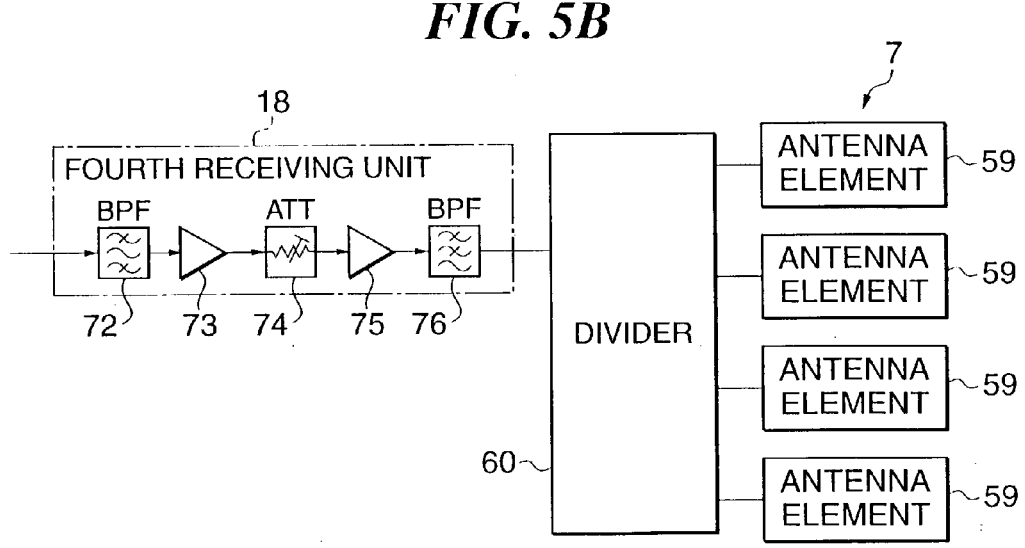

As shown in FIGS. 5A and 5B, the transmitting antenna 7 serves to radiate the intermediate carrier waves of high-frequency band toward the mobile station. The elements 59 of the transmitting antenna 7 are integrally connected to the fourth receiving unit 18 through a divider 60. The receiving antenna 8 serves to receive the intermediate carrier waves of high-frequency band transmitted from the mobile station. The elements 61 of the receiving antenna 8 are integrally connected to the first transmitting unit 19 through a divider 62.

The third receiving unit 17 and the fourth receiving unit 18 in the indoor transmitting section 11 will be described hereinafter with reference to FIG. 4.

The third receiving unit 17 comprises a D/A converter 63, a low-pass filter (LPF) 64, a first amplifier 65, a first attenuator (ATT) 66, a second amplifier 67, a frequency mixer 68, a local oscillator 69, a first band-pass filter (BPF) 70, and a third amplifier 71.

The D/A converter 63 has the input stage connected to the interface 22. The D/A converter 63 is a decoder for converting a digital signal inputted thereto into its corresponding analog signal (original signal). The low-pass filter 64 connected to the output of the D/A converter 63 functions to integrate the waveform of the signal, consequently to eliminate undesired components of the signal received. The first amplifier 65 connected to the output of the low-pass filter 64 amplifies the signal outputted from the low-pass filter 64. The first attenuator 66 connected to the output of the first amplifier 65 attenuates the aforementioned intermediate frequency signal amplified by first the amplifier 65 in order to optimize the desired band level. The second amplifier 67 amplifies the frequency signal attenuated by the first attenuator 66. By the frequency mixer 68 connected to the output of the second amplifier 67, the inputted signal is mixed with the signal having the desired frequency from the local oscillator 69, thus to convert the frequency of the inputted signal and output the frequency converted signal thus obtained. For instance, a phase-locked loop (PLL) frequency synthesizer may be used as the local oscillator 69. The first band-pass filter 70 connected to the output of the frequency mixer 68 discriminates just the signal having lower frequency than that of the intermediate frequency signal. The third amplifier 71 connected to the output of the first band-pass filter 70 amplifies the intermediate frequency signal inputted thereto. The signal amplified by the third amplifier 71 is outputted to the fourth receiving unit 18.

The fourth receiving unit 18 includes a second band-pass filter (BPF) 72, a fourth amplifier 73, a second attenuator (ATT) 74, a fifth amplifier 75, and a third band-pass filter (BPF) 76. The fourth receiving unit 18 is connected to the third receiving unit 17 through the second band-pass filter 72 located at the input stage (right side in FIG. 4) and integrally to the transmitting antenna 7 through the third band-pass filter 76 located at the output stage (eft side in FIG. 4). The second band-pass filter 72 discriminates the intermediate frequency signal outputted from the third amplifier 71. The fourth amplifier 73 connected to the output of the second band-pass filter 72 amplifies the intermediate frequency signal discriminated by the second band-pass filter. The second attenuator 74 attenuates the aforementioned intermediate frequency signal thus amplified to optimize the desired frequency level. The fifth amplifier 75 is a power amplifier (PA) for amplifying the intermediate frequency signal attenuated by the second attenuator 74. The third band-pass filter 76 connected to the output of the fifth amplifier 75 derives just the signal having the desired frequency band from the intermediate frequency signal inputted thereto, and then, output the desired signal thus derived to the transmitting antenna 7. Consequently, a specific high-frequency signal is radiated toward the base station from the antenna 7.

The first transmitting unit 19 and second transmitting unit 20 in the indoor transmitting section 12 will be described hereinafter with reference to FIG. 4.

The first transmitting unit 19 includes a first band-pass filter (BPF) 77, and a low-noise amplifier (LNA) 78. The first band-pass filter 77 discriminates the signal of the desired frequency band from the high-frequency band signal received by the antenna 8. The low-noise amplifier 78 amplifies the high-frequency signal of the frequency band discriminated by the first band-pass filter 77 with low noise. The low-noise amplifier 78 has the output stage connected to the first frequency mixer 79 of the second transmitting unit 20.

The second transmitting unit 20 includes the first frequency mixer 79, a first local oscillator 80, a second band-pass filter (BPF) 81, a first amplifier 82, an attenuator (ATT) 83, a second amplifier 84, a second frequency mixer 85, a second local oscillator 86, a low-pass filter (LPF) 87, an A/D converter 88, and a digital signal processor (ASIC) 89.

By the frequency mixer 79, the signal outputted from the low-noise amplifier 78 is mixed with the signal having the desired frequency from the first local oscillator 80, thus to convert the frequency of the inputted signal and output the frequency converted signal thus obtained. The first amplifier 82 connected to the output of the first frequency mixer 79 amplifies the first intermediate frequency signal outputted from the first frequency mixer. The attenuator 83 connected to the output of the first amplifier 82 attenuates the signal to optimize the desired band level. The second amplifier 84 amplifies the first intermediate frequency signal attenuated by the attenuator 83. By the second frequency mixer 85 connected to the output of the second amplifier 84, the first intermediate frequency signal inputted thereto is mixed with the signal having the desired frequency from the second local oscillator 86, thus to convert the frequency of the inputted signal and output the frequency converted signal thus obtained. The low-pass filter 87 connected to the output of the second frequency mixer 85 eliminates unnecessary signals having undesirable frequency bands other than the desired second intermediate frequency signal. The A/D converter 88 connected to the output of the low-pass filter 87 is a decoder for converting the digital signal inputted thereto into its corresponding analog signal (original signal). The digital signal processor 89 has the input stage connected to the A/D converter 88 and the output stage connected to the interface 22. The comprehensive digital processor 90 is composed of the A/D converter 88 and the digital signal processor 89. The structure and function of the comprehensive digital processor 90 are substantially identical with those of the aforementioned comprehensive digital processor 40. Accordingly, the description of structure and function of the comprehensive digital processor 90 (A/D converter 88 and digital signal processor 89) are omitted below to avoid repetition.

As the digital transmission line 4, there may be used a coaxial cable, an optical fiber or the like. Where the transmission of the digital transmission line is less than 100 meters, it is desirable to use a coaxial cable from an economic point of view. In a case of the long-distance digital transmission line over 100 meters, the optical fiber may preferably be used as the transmission line.

Figure 6:
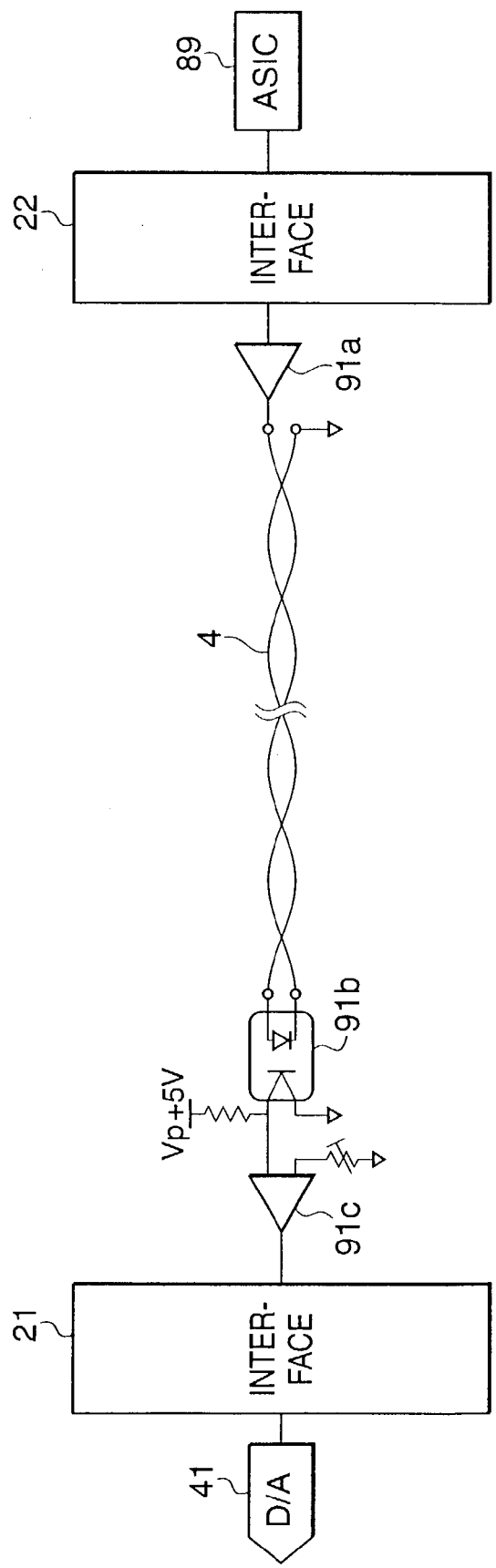
FIG. 6 is a block diagram showing a digital transmission line on the transmission side in the radio relay apparatus of the invention.

The digital transmission line 4 illustrated in FIG. 6 is formed of the coaxial cable. The illustrated digital transmission line 4 constitutes a transmitting transmission line for transmitting the signal from the outdoor relay section 2 to the indoor relay section 3. The digital transmission line 4 has one terminal (right side terminal in FIG. 6) connected to the interface 22 in the indoor relay section 3 through a driver 91*a* and the other terminal connected to the interface 21 in the outdoor relay section 2 through a photo coupler 91*b* and a comparator 91*c*.

Digital processing in high-frequency band with the comprehensive digital processor 40 will be described hereinafter with reference to FIGS. 7 and 8.

Figure 7:
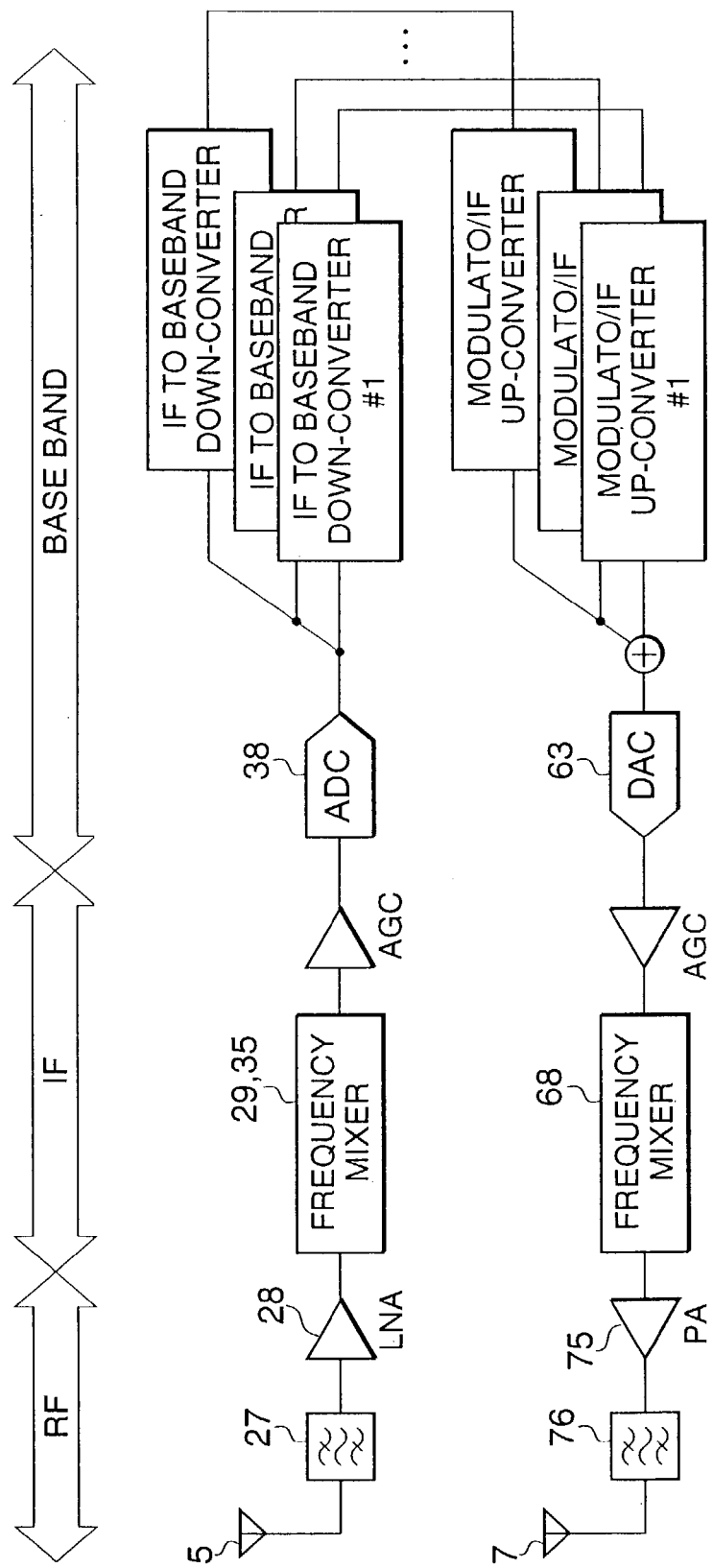
FIG. 7 is a block diagram showing a process for converting high frequency, intermediate frequency and base bands in the radio relay apparatus of the invention.

FIG. 7 is a block diagram showing a process for digital transmission of the high-frequency signal from the outdoor receiving section 9 to the indoor receiving section 11. FIG. 8 is a block diagram showing a control circuit 92 for the comprehensive digital processor 40.

Radio frequency (RF) is received by the outdoor receiving section 9 and converted into intermediate frequency. The intermediate frequency is down-converted to its base-band frequency by the A/D converter (ADC) 38. In down converting, the desired frequency band is fitly selected automatically or on a computer by means of the digital signal processor 39. The transmission method used in the invention is a time division multiplex access system for transmitting the signals through multiple channels (1st channel to 32nd channel in FIG. 8) on a time sharing basis. Each frequency band thus time-shared is subjected to quadrature amplitude modulation (QUAD) for narrowing a transmitting frequency band at 1 bit/sec., consequently to assure necessary capacity of transmission.

The signal in the digital band selected by the digital signal processor is transmitted to the indoor receiving section 11 through base band transmission.

As shown in FIG. 7, the high-frequency signal received by the antenna 5 in the outdoor receiving section 9 is selected as a desired band signal by the first band-pass filter 27, amplified by the low-noise amplifier (LNA) 28 with low noise, converted to the intermediate frequency, and subjected to analog-to-digital conversion by the A/D converter (ADC) 38 while maintaining the output constant by using an automatic gain control circuit (AGC), thus to be down-converted. The signal within the digital band selected by the digital signal processor 39 is transmitted to the indoor receiving section 11 through base band transmission. The digital signal thus transmitted is sent to the D/A converter (DAC) 63 through the interface 22 of the indoor receiving section 11 and there converted to its corresponding analog signal to be up-converted, converted to its corresponding intermediate frequency signal while maintaining the output constant by using an automatic gain control circuit (AGC), amplified by the power amplifier (PA) 75, derived as the desired band signal by the third band-pass filter 76, and then, radiated from the antenna 7 toward the mobile station.

Figure 8:
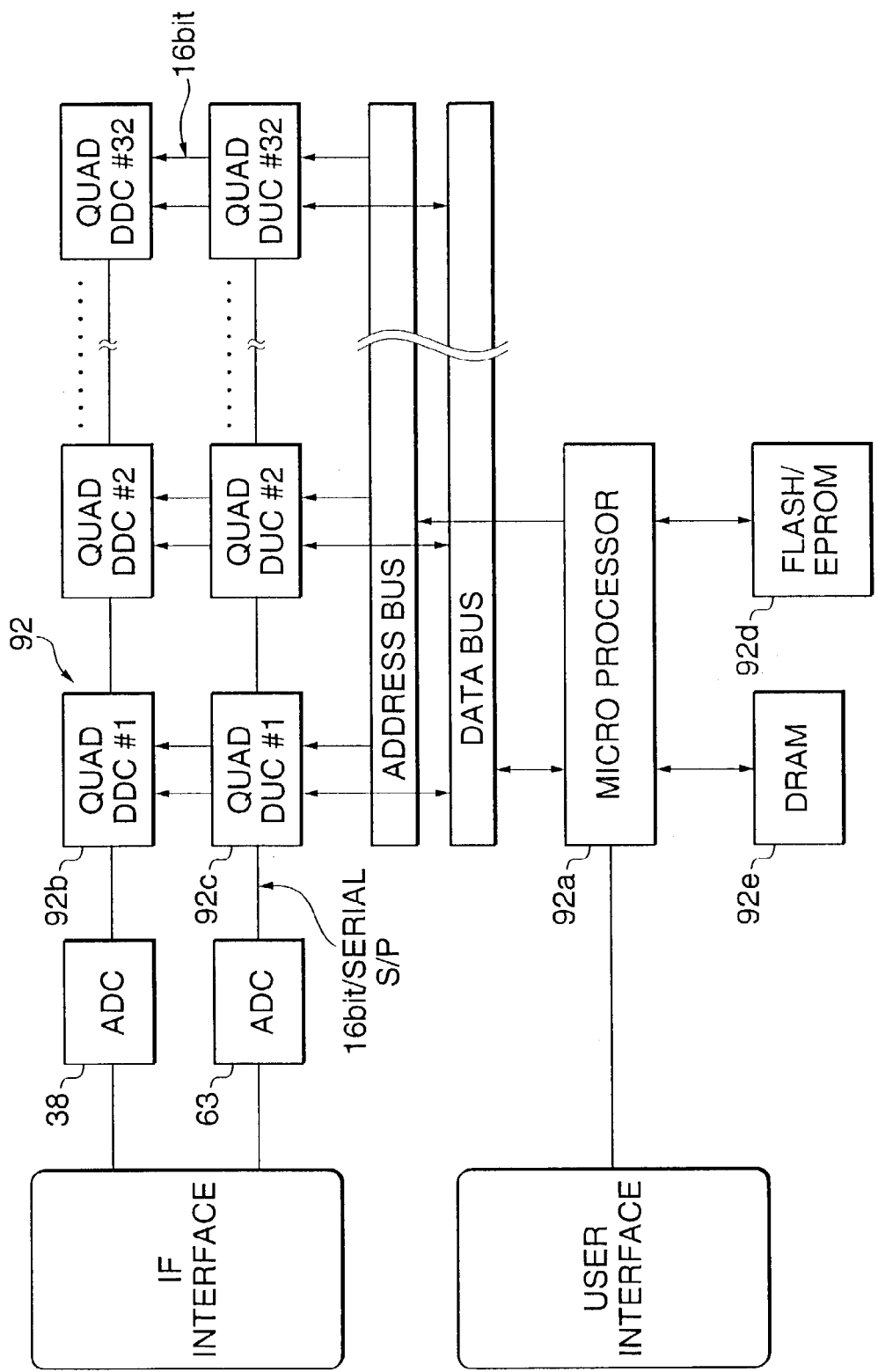
FIG. 8 is a block diagram showing a control circuit in a comprehensive digital processor of the radio relay apparatus of the invention.

In FIG. 8, the digital signal processor 39 is capable of selecting unrestricted frequency band by means of the control circuit 92. That is, the digital signal processor 39 makes it possible to widen or narrow the frequency band. With a microprocessor 92*a* of the control circuit 92, a digital down-converter (DDC) 92*b* and a digital up-converter (DUC) 92*c* are controlled. The determination of frequency band in selecting the band is performed on the basis of data stored in a read-only EPROM 92*d* by using a microprocessor 92*a*. The microprocessor 92*a* is connected to a computer of a user, so that an arbitrary desired band can be written into a memory such as a dynamic RAM 92*e*. Consequently, the user can arbitrarily select the desired band with the microprocessor 92*a*.

Data (signal) are transmitted in a 16-bit serial. The transmission to the A/D converter is transformed into a parallel form.

The number of terminal users at the mobile stations is comprehended by the digital signal processor 39.

The mutual relaying between the base station and the mobile station are carried out by the aforementioned radio relay apparatus 1 of the invention in the following manner.

Figure 4:
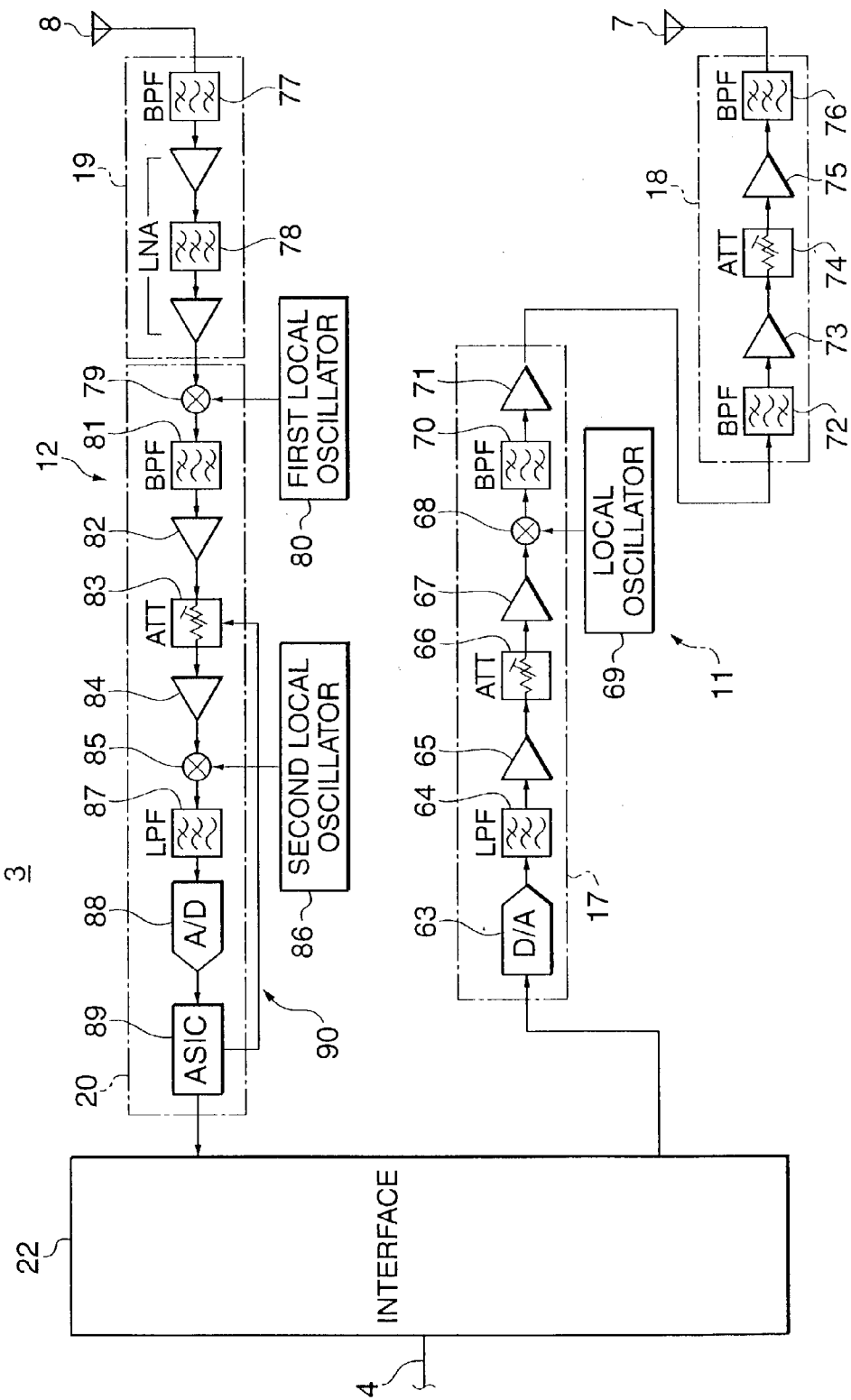
FIG. 4 is a block diagram showing an indoor relay unit of the radio relay apparatus of the invention.

The high-frequency band carrier wave signal transmitted from the base station and received by the antenna 5 is converted to the desired frequency band by the outdoor receiving section 9 as shown in FIGS. 2 and 4. The analog band signal is converted to its corresponding digital band signal by the comprehensive digital processor 40 and transmitted to the indoor receiving section 11 through the digital transmission line 4. The digital band signal is further converted to its corresponding analog band signal b the D/A converter 63, and then, transmitted from the antenna 7 toward the mobile station.

The relaying carrier wave signal from the mobile station to the base station is received by the antenna 8 and converted to its corresponding digital band signal by the comprehensive digital processor 90 in the indoor transmitting section 12. The digital band signal thus obtained is up-converted in the outdoor transmitting section 10 to be decoded to the original analog band signal, and then, transmitted from the antenna 6 to the base station.

Another embodiment of the radio relay apparatus of the invention will be described hereinafter with reference to FIG. 9 through FIG. 14.

A radio relay apparatus 101 according to the invention is fundamentally common to the radio relay apparatus 1 described above except for the following two structures.

Figure 9:
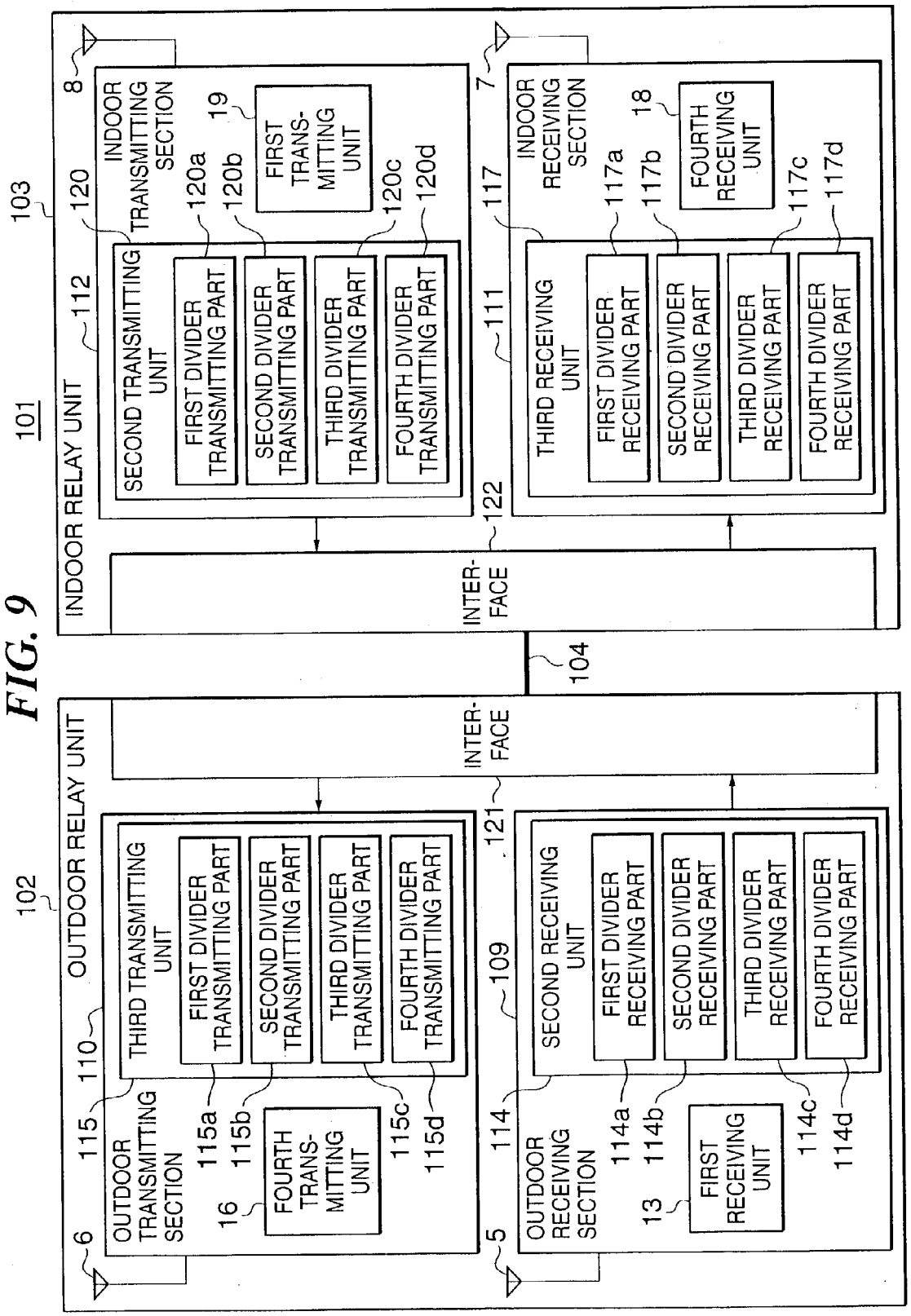
FIG. 9 is a schematic view showing another embodiment of the radio relay apparatus according to the invention.

First, the second receiving unit 114, third receiving unit 117, the second transmitting unit 120 and third transmitting unit 115 in this embodiment are branched in the form of multistage as shown in FIG. 9.

Secondly, an optical fiber is used as a digital transmission line 104 as shown in FIG. 14.

These components, which are not found in the foregoing embodiment, will be described hereinafter. The identical or similar components of this embodiment to those of the foregoing embodiment are omitted. The identical components in the radio relay apparatus 101 of this embodiment are denoted by like numerical symbols.

In the outdoor receiving section 109 of the outdoor relay unit 102 shown in FIG. 9, the second receiving unit 114 is diverged into four stages, i.e. first divider receiving part 114*a*, second divider receiving part 114*b*, third divider receiving part 114*c*, and fourth divider receiving part 114*d*.

Figure 10:
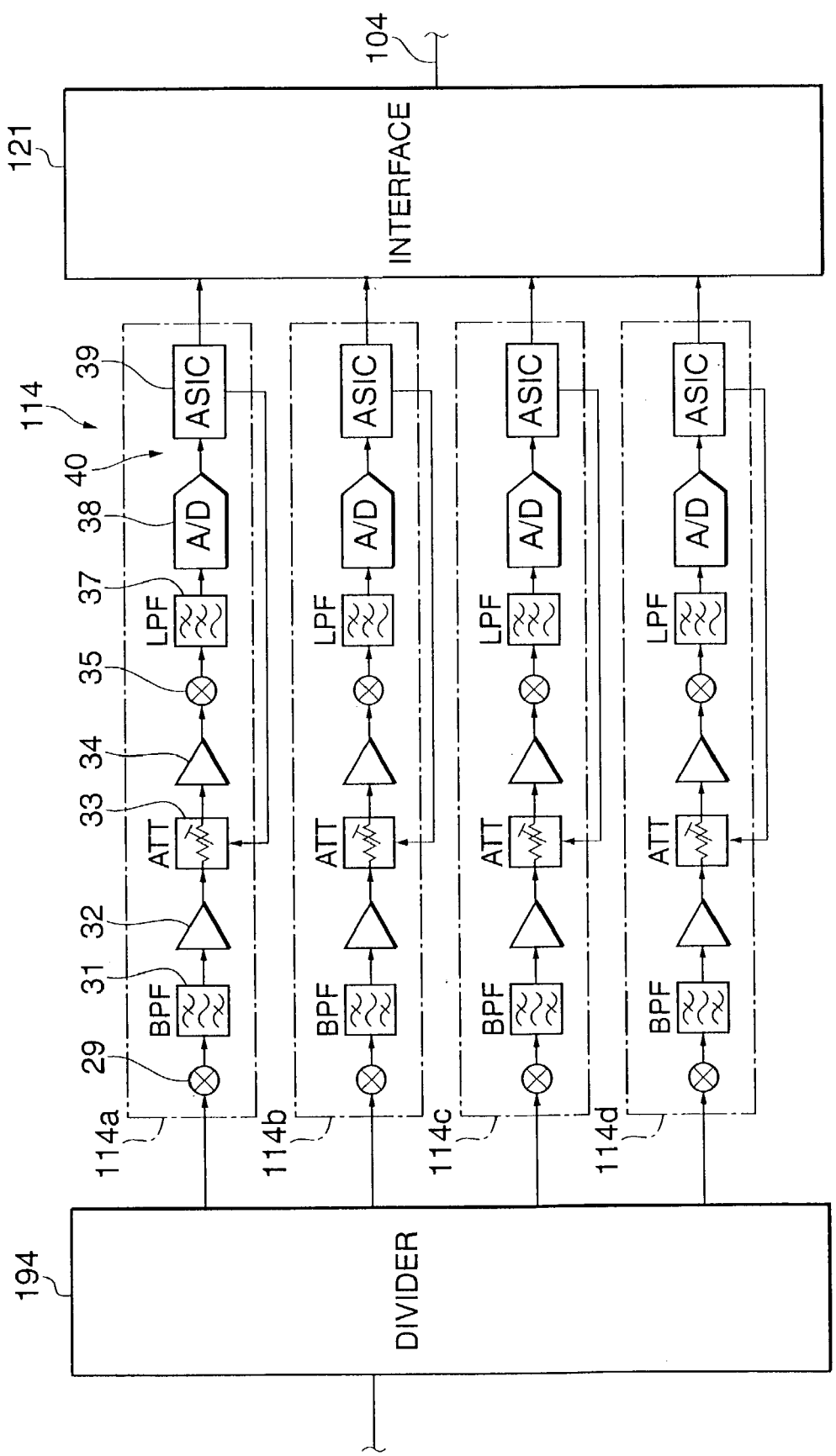
FIG. 10 is a block diagram showing an outdoor receiving section of the apparatus in FIG. 9.

As shown in FIG. 10, the first divider receiving part 114*a* to fourth divider receiving part 114*d* in the second receiving unit 114 are connected to the first receiving unit 13 through a divider 194 on the left side in the drawing and to an interface 121 on the right side in the drawing. The component counterparts of the first to fourth divider receiving parts 114*a* to 114*d* are common to one another and equivalent to those of the second receiving unit 14 in the outdoor receiving section 9 shown in FIG. 2. Hence, the description of the component parts of the first to fourth divider receiving parts 114*a* to 114*d* is omitted below.

The high-frequency signal transmitted from the first receiving unit 13 is divided by the divider 194, thus to bring forth the desired signals having different frequency bands by means of the respective band-pass filters 31. The respective signals thus produced are subjected to digital processing, consequently to be outputted to the interface 121.

In the outdoor transmitting section 110 of the outdoor relay unit 102 shown in FIG. 9, the third transmitting unit 115 is diverged into four stages, i.e. first divider transmitting part 115*a*, second divider transmitting part 115*b*, third divider transmitting part 115*c*, and fourth divider transmitting part 115*d*.

Figure 11:
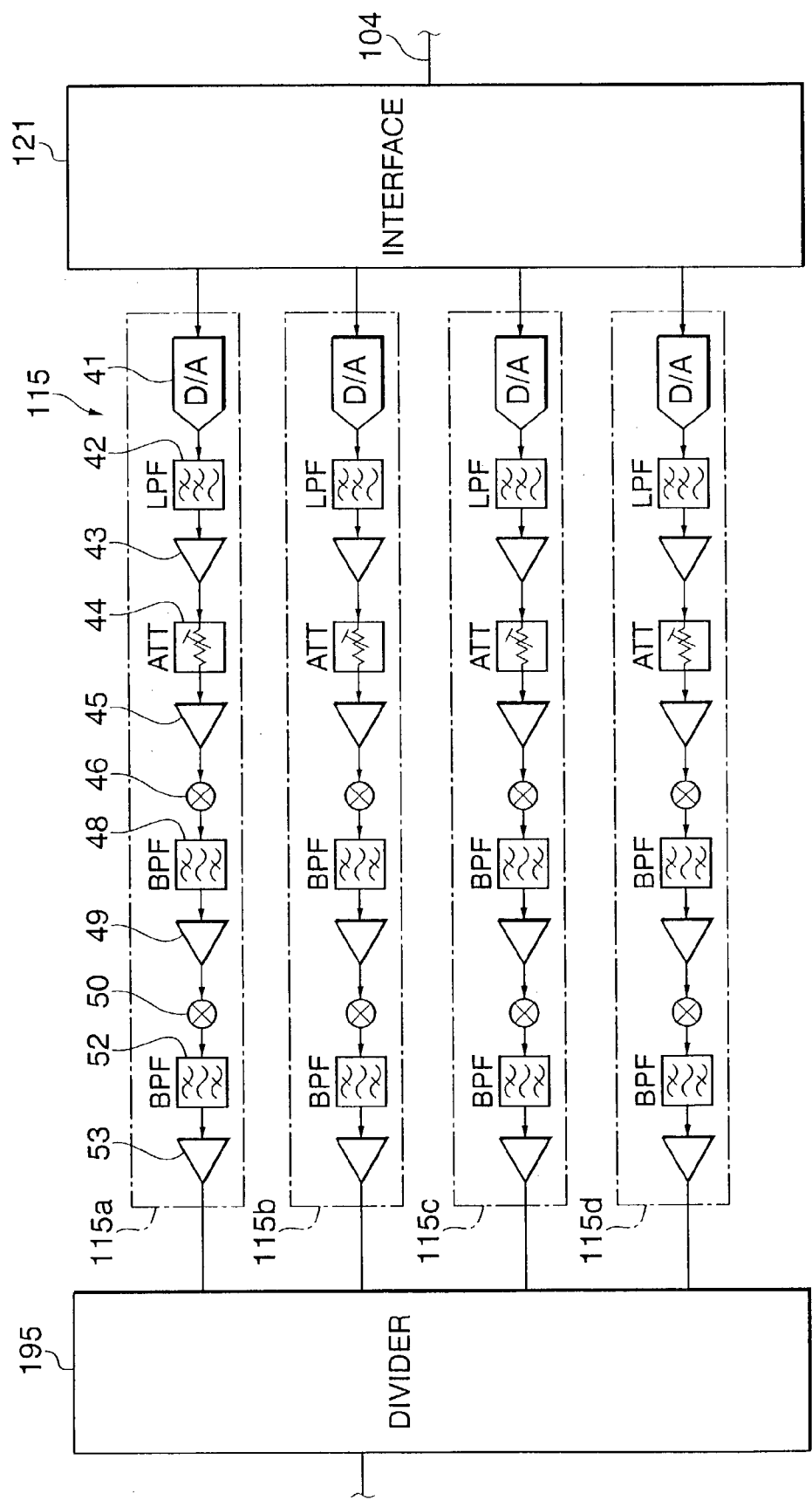
FIG. 11 is a block diagram showing an outdoor transmitting section of the apparatus in FIG. 9.

As shown in FIG. 11, the first divider transmitting part 115*a* to fourth divider transmitting part 115*d* in the third transmitting unit 115 are connected to the fourth transmitting unit 16 through a divider 195 on the left side in the drawing and to an interface 121 on the right side in the drawing. The component counterparts of the first to fourth divider transmitting parts 115*a* to 115*d* are common to one another and equivalent to those of the third transmitting unit 15 in the outdoor transmitting section 10 shown in FIG. 2. Hence, the description of the component parts of the first to fourth divider transmitting parts 115*a* to 115*d* is omitted below.

The digital signals are respectively inputted to the first to fourth divider transmitting parts 115*a* to 115*d* through the interface 121 in the outdoor relay unit 102, and converted to their corresponding analog signals. Then, the desired frequency band signals are derived from the respective converted signals by the band-pass filters 48 and 52, amplified by the amplifiers 53, combined with one another by the divider 195, and then, outputted to the fourth transmitting unit 16.

Figure 12:
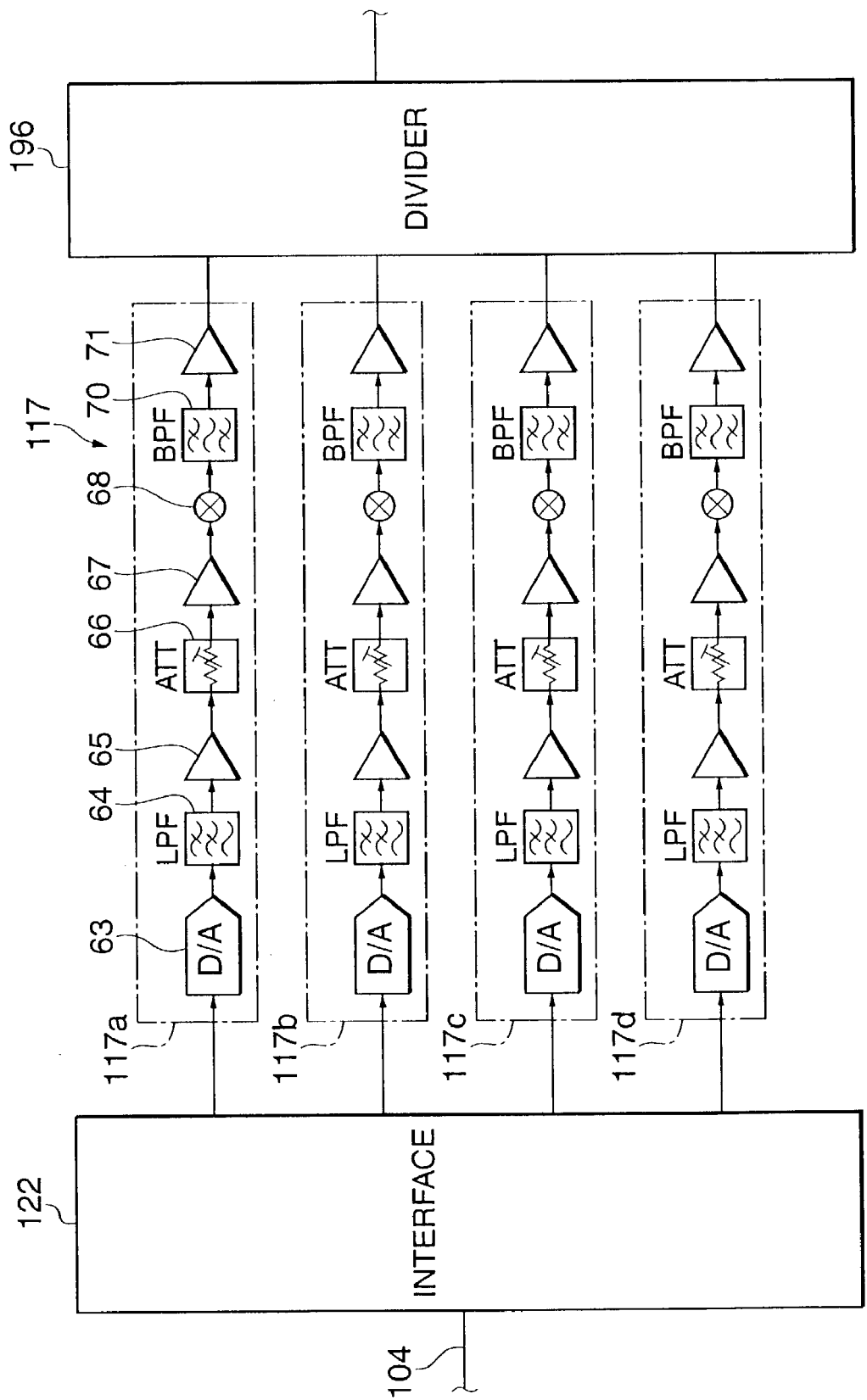
FIG. 12 is a block diagram showing an indoor receiving section of the apparatus in FIG. 9.

In the indoor receiving section 111 in the indoor relay unit 103 shown in FIGS. 9 and 12, the third receiving unit 117 is diverged into four stages, i.e. first divider receiving part 117*a*, second divider receiving part 117*b*, third divider receiving part 117*c*, and fourth divider receiving part 117*d*. The first to fourth divider receiving parts 117*a* to 117*d* are connected to the interface 122 on the left side of FIG. 12 and to the divider 196 on the right side of FIG. 12. The component counterparts of the first to fourth divider receiving parts 117*a* to 117*d* are common to one another and equivalent to those of the second receiving unit 17 in the outdoor receiving section 11 shown in FIG. 4. Hence, the description of the component parts of the first to fourth divider receiving parts 117*a* to 117*d* is omitted below.

The digital signals are respectively inputted to the first to fourth divider receiving parts 117a to 117d through the interface 122 in the outdoor relay unit 103, and converted to their corresponding analog signals to derive the desired frequency band signals from the respective converted signals by the band-pass filters 70. Then, the derived signals are amplified by the amplifiers 71, combined with one another by the divider 196, and outputted to the fourth receiving unit 18.

In the indoor transmitting section 112 in the indoor relay unit 103 shown in FIGS. 9 and 13, the second transmitting unit 120 is diverged into four stages, i.e. first divider transmitting part 120a, second divider transmitting part 120b, third divider transmitting part 120c, and fourth divider transmitting part 120d. The first to fourth divider transmitting parts 120a to 120d of the second transmitting unit 120 are connected to the interface 122 on the left side of FIG. 13 and to the divider 197 on the right side of FIG. 13. The component counterparts of the first to fourth divider transmitting parts 120a to 120d are common to one another and equivalent to those of the second transmitting unit 20 in the indoor transmitting section 12 shown in FIG. 4. Hence, the description of the component parts of the first to fourth divider transmitting parts 120a to 120d is omitted below.

The high-frequency signal transmitted from the first transmitting unit 19 is divided by the divider 197, so that the desired signals having different frequency bands are derived by the respective band-pass filters 81 from the signals thus divided to the first divider transmitting parts 120a to 120d, subjected to digital processing, and outputted to the interface 122.

Local oscillators connected to the frequency mixers 29, 35, 46, 50, 68, 79 and 85 are not illustrated in FIGS. 9 through 12.

In the embodiment of FIG. 14, an optical fiber is used as the digital transmission line 104. The illustrated digital transmission line 104 corresponds to a transmitting-end transmission line for transmitting the signal from the indoor relay unit 103 to the outdoor relay unit 104. The digital transmission line 104 has one terminal (right end in FIG. 14) connected to the interface 122 of the indoor relay unit 103 having a multiplexing function and an optical-converting function, and the other terminal connected to the interface 121 of the outdoor relay unit 102 having an optical-converting function and a demultiplexing function.

In FIG. 14, reference numeral 198 denotes an amplifier provided on the input side of the interface 122 of the indoor relay unit 103, and reference numeral 199 denotes an amplifier provided on the output side of the interface 121 of the outdoor relay unit 102.

The mutual signal relaying between the base station of the aforementioned radio relay apparatus 101 and the mobile station in a blind area is performed in the following manner.

The RF signal of high-frequency band, which is issued from the base station and received by the antenna 5, is converted to the signals of the desired frequency bands by the respective first to fourth divider receiving parts 114a to 114d of the second receiving unit 114 in the outdoor receiving section 109, as shown in FIGS. 9, 10 and 12. The analog signals thus obtained are converted to their corresponding digital band signals by the comprehensive digital processor 40, and then, transmitted to the indoor receiving section 111 to the digital transmission line 104 in a multiplexing manner, thus to be multiplexed and separated. The digital frequency band signals thus separated are converted to their corresponding analog frequency band signals by the D/A converters 63 and transmitted from the antenna 7 toward the mobile stations.

The relaying RF signals to be transmitted from the mobile station to the base station are received by the antenna 8 and respectively converted to the desired frequency band signals in the first to fourth divider transmitting parts 120a to 120d of the indoor transmitting section 112, as shown in FIGS. 9, 11 and 13. Thereafter, the signals thus converted are processed into digital frequency band signals by the comprehensive digital processor 90, multiplexed, separated and diverged in the outdoor transmitting section 110. Each signal in the first to fourth divider transmitting units 115a to 115d is decoded to the analog frequency band signal, and then, up-converted, consequently to be transmitted from the antenna 6 to the base station.

The radio relay apparatus 201 illustrated in FIGS. 15A, 15B, 16A and 16B is concretely modified from the radio relay apparatus 101 shown in FIG. 9, so that the RF signals of the order of 2 GHz can be used.

The outdoor relay unit 202 will be described hereinafter with reference to FIGS. 15A, 15B and 17.

Figure 15B:
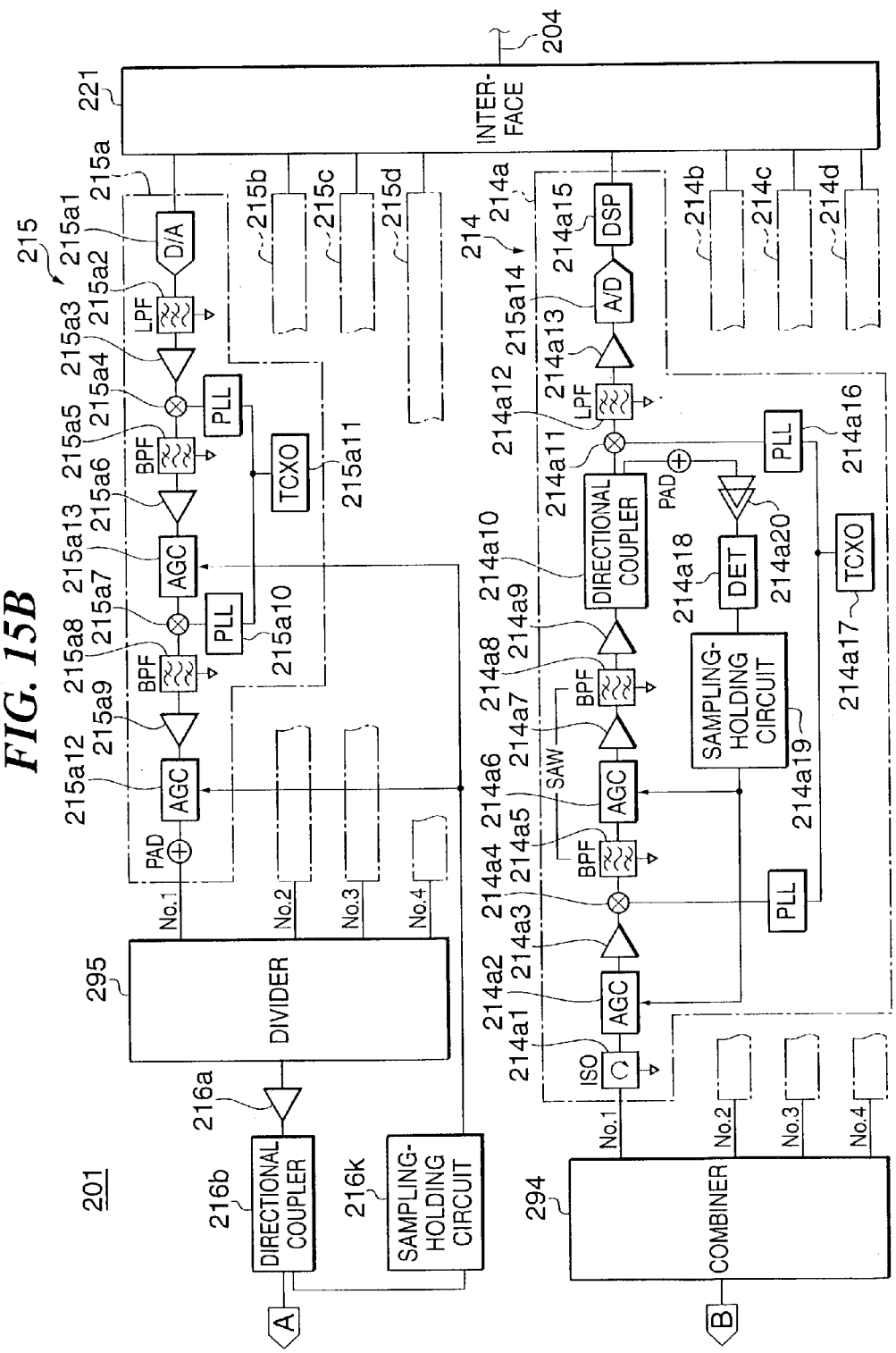

The first receiving unit 213 shown in FIGS. 15A and 15B is connected to the divider 224 on the left side in the drawing and to the combiner 294 on the right side in the drawing (FIG. 15B). To the divider 224, the element 223 of the antenna 205 is connected. The first receiving unit 213 includes a first isolator (ISO) 213a, a first band-pass filter 213b, a low-noise amplifier 231c, a directional coupler 213d, a first amplifier (AMP) 213e, and second and third isolators (ISO) 213f and 213j. The directional coupler 213d is connected to the amplifier (AMP) 213g and a detector (DET) 213h. The detector 213h detects RF outputted from the low-noise amplifier 213c to derive an objective signal. The derived signal is encoded and held in signal level by a sampling-holding circuit 213i.

The second receiving unit 214 shown in FIG. 15B includes a first divider receiving part 214a, a second divider receiving part 214b, a third divider receiving part 214c, and a fourth divider receiving part 214d. The first to fourth divider receiving parts 214a to 214d in the second receiving unit 214 are connected to the first receiving unit 213 through the combiner 294 on the left side of FIG. 15B and to the interface 221 on the right side thereof. The component counterparts of the first to fourth divider receiving parts 214a to 214d are common to one another. Therefore, only the first divider receiving part 214a will be described hereinafter, and the description of the second to fourth divider receiving parts 214b to 214d is omitted below.

The first divider receiving part 214a includes a fourth isolator (1SO) 214a1, a second amplifier 214a3, a first frequency mixer 214a4, a second band-pass filter 214a5, a third amplifier 214a7 a third band-pass filter 214a8, a fourth amplifier 214a9, a second frequency mixer 214a11, a low-pass filter 214a12, a fifth amplifier 214a13, an A/D converter 214a14, and a digital signal processor (DSP) 214a15. An automatic gain control circuit (AGC) 214a2 is disposed between the fourth isolator 214a1 and the second amplifier 214a3, and an automatic gain control circuit (AGC) 214a6 is disposed between the second band-pass filter 214a5 and the third amplifier 214a7. Between the fourth amplifier 214a9 and the second frequency mixer 214a11, there is disposed a directional coupler 214a10. Between the first frequency mixer 214a4 and the second frequency mixer 214a11, there is disposed a phase-locked loop (PLL) frequency synthesizer 214a16 to secure high stability in frequency. To elevate high stability of the PLL frequency synthesizer 214a16, a reference oscillator 214a17 with a temperature-compensated crystal oscillator (TCXO) is used in this embodiment. The signal outputted from the detector (DET) 214a18 connected to the directional coupler 214a10 is encoded by the sampling-holding circuit 214a19. Denoted by 214a20 is an amplifier. The digital signal processor 214a15 is substantially identical with the aforementioned digital signal processor 39.

A third transmitting unit 215 shown in FIG. 15B includes a first divider transmitting part 215a, a second divider transmitting part 215b, a third divider transmitting part 215c, and a fourth divider transmitting part 215d. The first to fourth divider transmitting parts 215a to 215d of the third transmitting unit 215 are connected to the fourth receiving unit 216 (FIG. 15A) through the divider 295 on the left side in FIG. 15A, and to the interface 221 on the right side in the drawing. The component counterparts of the first to fourth divider transmitting parts 215a to 215d are common to one another. Therefore, only the first divider transmitting part 215a will be described hereinafter, and the description of the second to fourth divider transmitting parts 215b to 215d is omitted below.

The first divider transmitting part 215a includes a D/A converter 215a1 connected to the interface 221 on the right side in FIG. 15B, a low-pass filter 215a2, a first amplifier 215a3, a first frequency mixer 215a4, a first band-pass filter 215a5, a second amplifier 215a6, a second frequency mixer 215a7, a second band-pass filter 215a8, and a third amplifier 215a9.

The first frequency mixer 215a4 and second frequency mixer 215a7 are connected to PLL frequency synthesizers 215a10, respectively. Between the PLL frequency synthesizers 215a10, there is connected a temperature-compensated crystal oscillator (TCXO) 215a11. An AGC circuit 215a12 is disposed between the second amplifier 215a6 and second frequency mixer 215a7, and another AGC circuit 215a13 is disposed between the third amplifier 215a9 and the divider 295.

In FIG. 15A, the fourth transmitting unit 216 is connected to a divider 226 on the left side of the drawing, and to the divider 295 (FIG. 15B) on the right side of the drawing. The divider 226 is connected to the element 225 of an antenna 206. As shown in FIG. 15B, the fourth transmitting unit 216 includes a fourth amplifier 216a, a direction coupler 216b, a first isolator 216c shown in FIG. 15A, a third band-pass filter 216d, a second isolator 216e, a fifth amplifier 216f, a sixth amplifier 216g, a second directional coupler 216h, a fourth band-pass filter 216i, and a third isolator 216j connected to the divider 226. As shown in FIG. 15B, a sampling-holding circuit 216k is connected on its output side to AGC circuits 215a12 and 215a13 of the first divider transmitting part 215a in the third transmitting unit 215, and on its input side to the first directional coupler 216b, respectively.

Between the second directional coupler 216h and the fifth amplifier, 216f, a sampling-holding circuit 216m is connected. Reference numeral 216n denotes an amplifier, and 216p denotes a detector (DET).

Figure 16A:
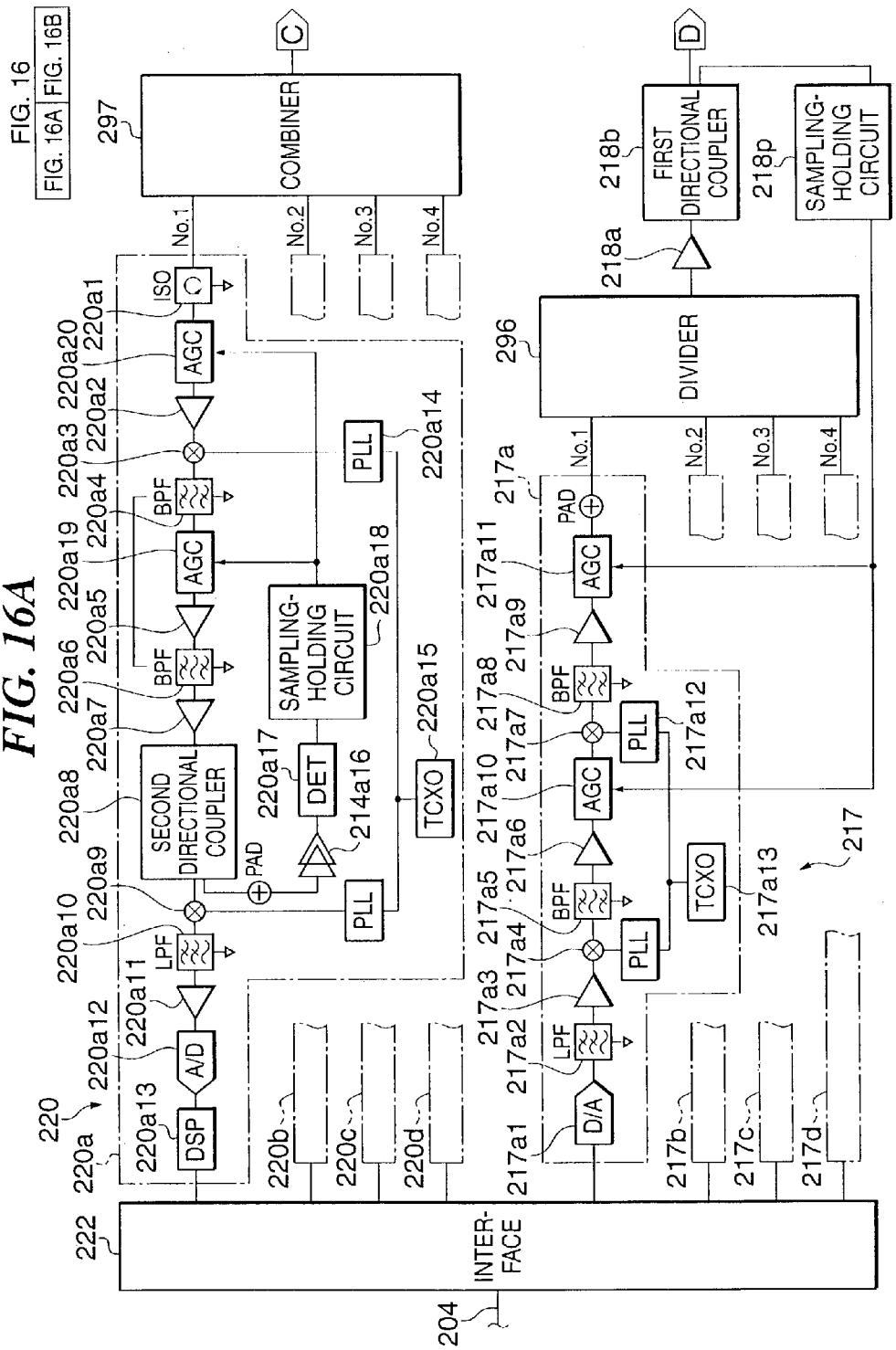
FIGS. 16A and 16B are block diagrams concretely showing the indoor relay unit of the invention.
Figure 16B:
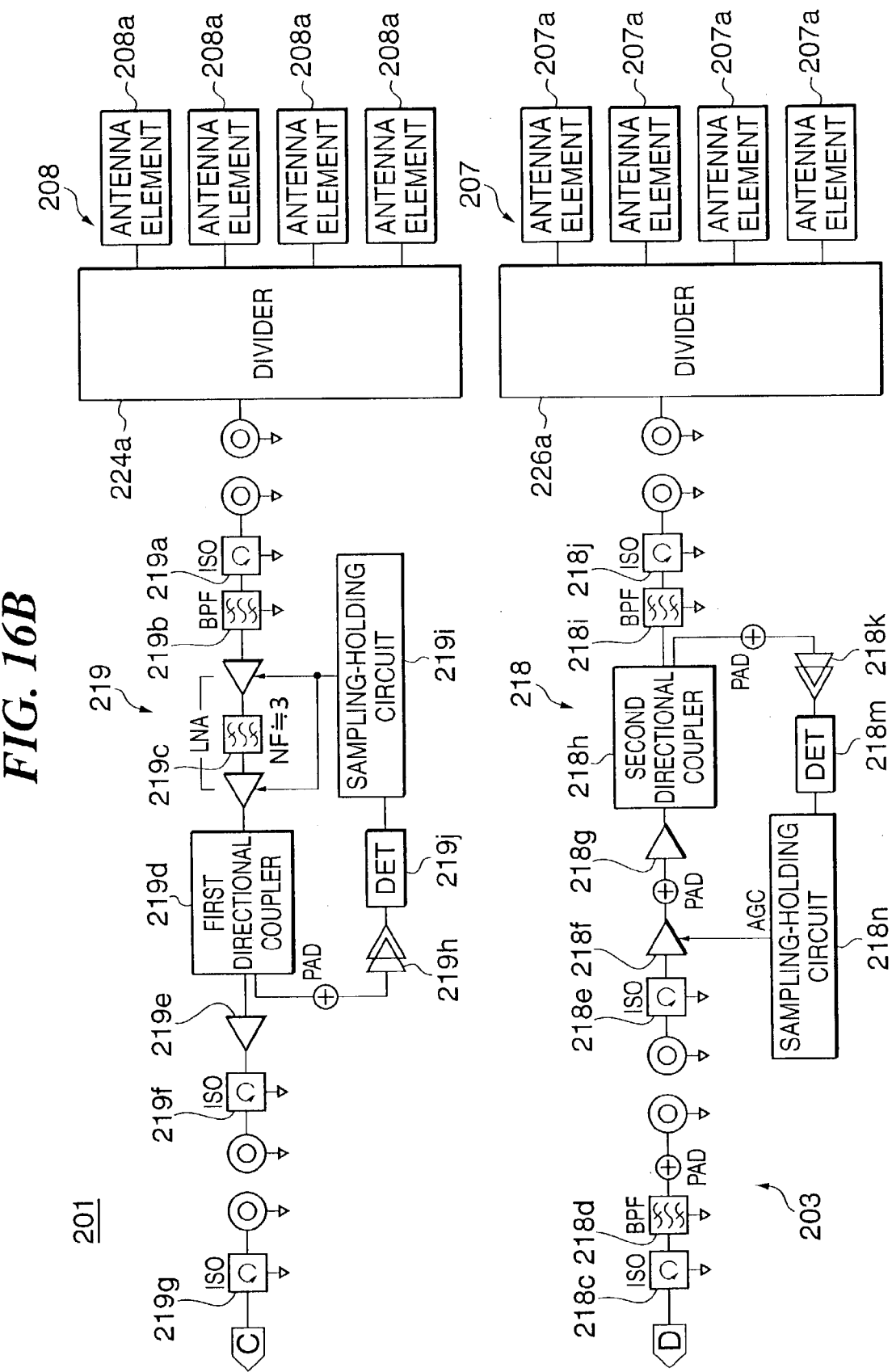
Figure 18:
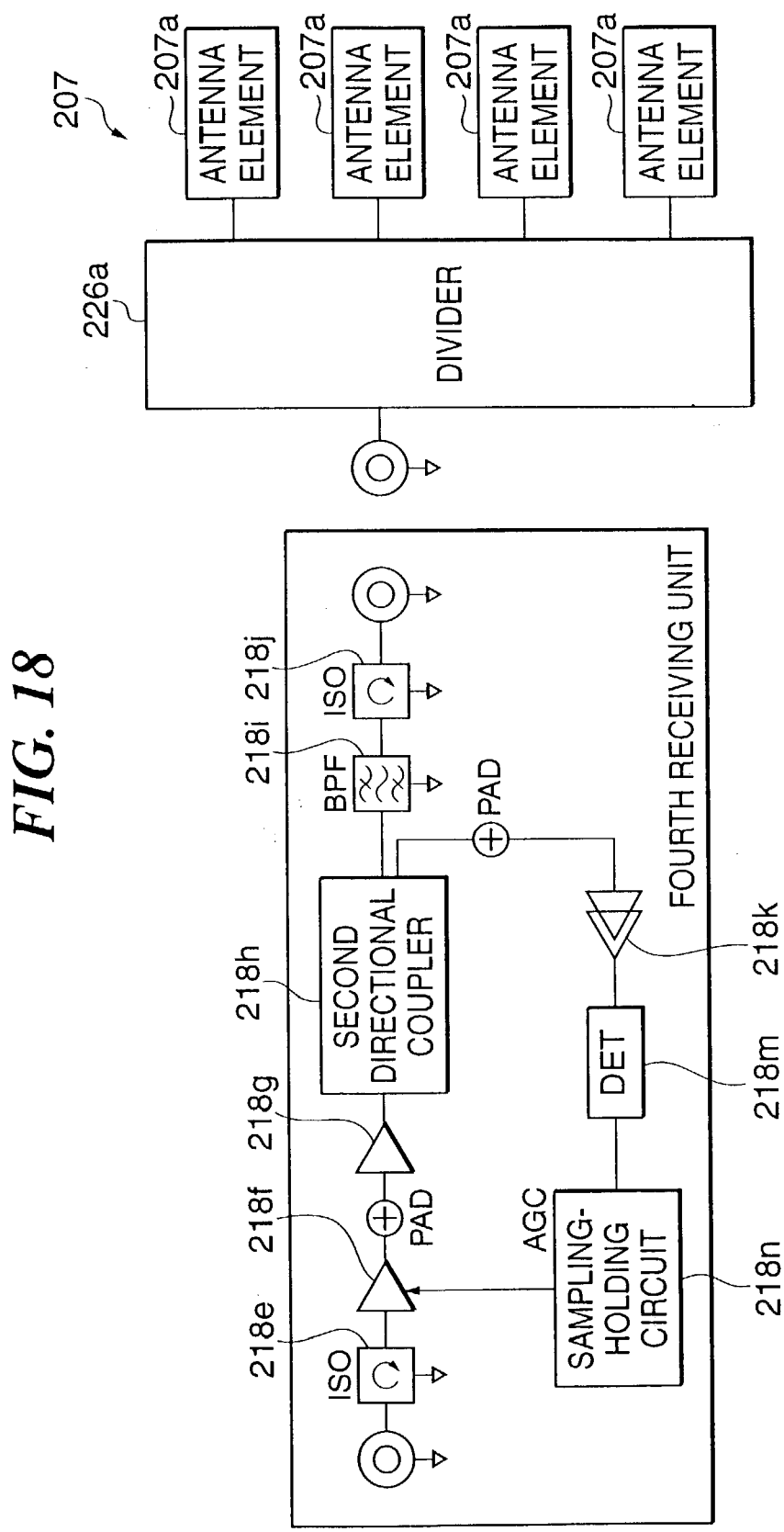
FIG. 18 is a block diagram showing the fourth transmitting unit and transmitting antennas in the unit shown in FIG. 15.

With reference to FIGS. 16A, 16B and 18, third and fourth receiving units 217 and 218 and first and second transmitting units 219 and 220 in the indoor relay unit 203 will be described hereinbelow.

The third receiving unit 217 is diverged into four stages, i.e. first divider receiving part 217a, second divider receiving part 217b, third divider receiving part 217c, and fourth divider receiving part 217d. The first to fourth divider receiving parts 217a to 217d are connected to an interface 222 on the left side of FIG. 16A, and to fourth receiving unit 218 through a divider 296 (FIGS. 16A and 16B) on the right side of the drawing. The first to fourth divider receiving parts 217a to 217d are common to one another. Therefore, only the first divider receiving part 217a will be described hereinafter, and the description of the second to fourth divider receiving parts 217b to 217d is omitted below.

The first divider receiving part 217a includes a D/A converter 217a1, a low-pass filter (LPF) 217a2, a first amplifier 217a3, a first frequency mixer 217a4, a first band-pass filter 217a5, a second amplifier 217a6, a second frequency mixer 217a7, a second band-pass filter 217a8, and a third amplifier 217a9.

Reference numerals 217a10 and 217a11 denote AGC circuits, 217a12 denotes a PLL synthesizer, 217a13 denotes a temperature-compensated crystal oscillator (TCXO).

The fourth receiving unit 218 shown in FIG. 16B is connected to the divider 296 (FIG. 16A) on the left side of the drawing, and to the divider 226a diverging into antennas 207 with elements 207a on the right side of the drawing.

The fourth receiving unit 218 includes a fourth amplifier 218a connected to the divider 296 shown in FIG. 16A, a first directional coupler 218b, the isolator 218c shown in FIG. 16B, a third filter 218d, a second isolator 218e, a fifth amplifier 218f, a sixth amplifier 218g, a second directional coupler 218h, a fourth band-pass filer 218i, and a third isolator 218j. A sampling-holding circuit 218p is connected to the first directional coupler 218b on its input side and to the AGC circuits 217a10 and 217a11, respectively.

In FIG. 18, an amplifier 218k is connected to the second direction coupler 218h on its input side and to a detector (DET) 218m on its output side. A sampling-holding circuit 218n is connected to the detector 218m on its input side, and to the fifth amplifier 218f on its output side. The sampling-holding circuit 218n serving to hold the sampling signal level makes even long-range communication between the receiving antenna 207 and the terminal (mobile station) hard to go dead.

A time-division multiplex digital communication is operated with a burst signal, in which one frame as a transmission unit of a digital signal is formed of 8 time slots. For instance, when an output in one frame is set to 1 W, a signal of one time slot brings forth an output of 1 W, but a signal of two time slots reduces the output by half to 0.5 W. That is, the output is decreased with increasing the time slot signal. This means that the decrease in output brings about easy interruption of communication with the mobile terminal.

Consequently, in the embodiment of FIG. 18, even in case of using 1 time slot or 8 time slots, the output of the amplifier (PA) 218g is kept constant by the sampling-holding circuit 218n. As noted above, if the output in one frame is set to 1 W and the output in terms of one time slot is fixed, the following formula is established.

1W÷8=0.125W

The output when using only 1 time slot is 0.125 W.

The output when using all 8 time slots is 0.125 W.

That is, even if the number of time slots is increased, the resultant output is not decreased.

Thus, the output from the amplifier 218g is kept constant at any time by the sampling-holding circuit 218n. As a result, the relaying RF signals of a fixed strength can be outputted from the antenna 207, consequently making communication between the antenna 207 and the distant terminal hard to go dead.

The first transmitting unit 219 and the second transmitting unit 220 will be described hereinbelow with reference to FIGS. 16A and 16B.

The first transmitting unit 219 shown in FIG. 16B is connected to a divider 297 (FIG. 16A) on the left side of the drawing and to a divider 224a coupled to elements 208a of receiving antennas 208 on the right side of the drawing.

The first transmitting unit 219 includes a first isolator 219a, a first band-pass filter 219b, a low-noise amplifier (LNA) 219c, a first directional coupler 219d, a first amplifier 219e, a second isolator 219f, and a third isolator 219g.

The amplifier 219h is connected to the first directional coupler 219d. Denoted by 219j is a detector (DET) disposed on the output side of the amplifier 219h. A sampling-holding circuit 219i is disposed on the output side of the detector 219j and connected to the low-noise amplifier (LNA) 219c.

A sampling-holding circuit 219i has the same function and effect as the aforementioned sampling-holding circuit 218n.

The second transmitting unit 220 is connected to the interface 222 on the left side of FIG. 16A and to the first transmitting unit 219 (FIG. 16B) through the divider 297 on the right side of the drawing.

The second transmitting unit 220 is diverged into four stages, i.e. first divider transmitting part 220a, second divider transmitting part 220b, third divider transmitting part 220c, and fourth divider transmitting part 220d.

The component counterparts of the first to fourth divider transmitting parts 220a to 220d are common to one another. Hence, the description of the component parts of the second to fourth divider transmitting parts 220b to 220d is omitted below.

The first divider transmitting unit 220a includes a fourth isolator 220a1, a second amplifier 220a2, a first frequency mixer 220a3, a second band-pass filter 220a4, a third amplifier 220a5, a third band-pass filter 220a6, a fourth amplifier 220a7, a second directional coupler 220a8, a second frequency mixer 220a9, a low-pass filter 220a10, a fifth amplifier 220a11, an A/D converter 220a12, a digital signal processor (DSP) 220a13. The digital signal processor (DSP) 220a13 is substantially identical with the aforementioned digital signal processor 214a15.

Between the first frequency mixer 220a3 and the second frequency mixer 220a9, there is connected a PLL synthesizer 220a14 for ensuring high stability of frequency. To further elevate the high stability of the PLL synthesizer, a temperature-compensated crystal oscillator (TCXO) is used as a reference oscillator 220a15. The detector (DET) 220a17 is connected to the second directional coupler 220a8 through the amplifier 220a16. The signal outputted from the detector 220a17 is encoded by the sampling-holding circuit 220a18 and then inputted to AGC circuits 220a19 and 220a20.

In the radio relay apparatus 201 shown in FIGS. 15A, 15B, 16A and 16B, the relaying RF signal transmitted from the base station toward the mobile station in the blind area is subjected to digital processing in the following manner.

The receiving antenna 205 of the outdoor relay unit 202 picks up a high frequency signal of 2 GHz from the base station. The relaying RF signal received by the antenna is transmitted to the second receiving unit 214 through the first receiving unit 213 and diverged into different frequency bands by the first to fourth divider receiving parts 214a to 214d. Each analog signal is converted to its corresponding digital signal by the A/D converter 214a14. Upon multiplexing, the electric signal is converted to its corresponding optical signal and transmitted to the first receiving unit 217 of the indoor relay unit 203 through the digital transmission line 204.

The optical digital signal thus multiplexed is converted to its corresponding electric signal in the first receiving unit 217 and separated. The separated digital signal is decoded to its corresponding analog signal by a D/A converter 217a1. The signals in the respective frequency bands are inputted to the relevant first to fourth divider receiving parts 217a to 217d and combined with one another by the divider 296. The combined signals are fed through the fourth receiving unit 218, diverged by the divider 226a, and transmitted from the respective antenna elements 207a of the antennas 207.

According to the radio relay apparatus 201 of the invention, the noise figure of the relaying RF signal received from the base station can be set to about 3 in the low-noise amplifier 213c by integration of the antenna 205 and the first receiving unit 213. Further, integration of the antenna 208 and the first transmitting unit 219 can set the noise figure of the relaying RF signal received from the cellular phone terminal to about 3 in the low-noise amplifier 219c.

Figure 19:
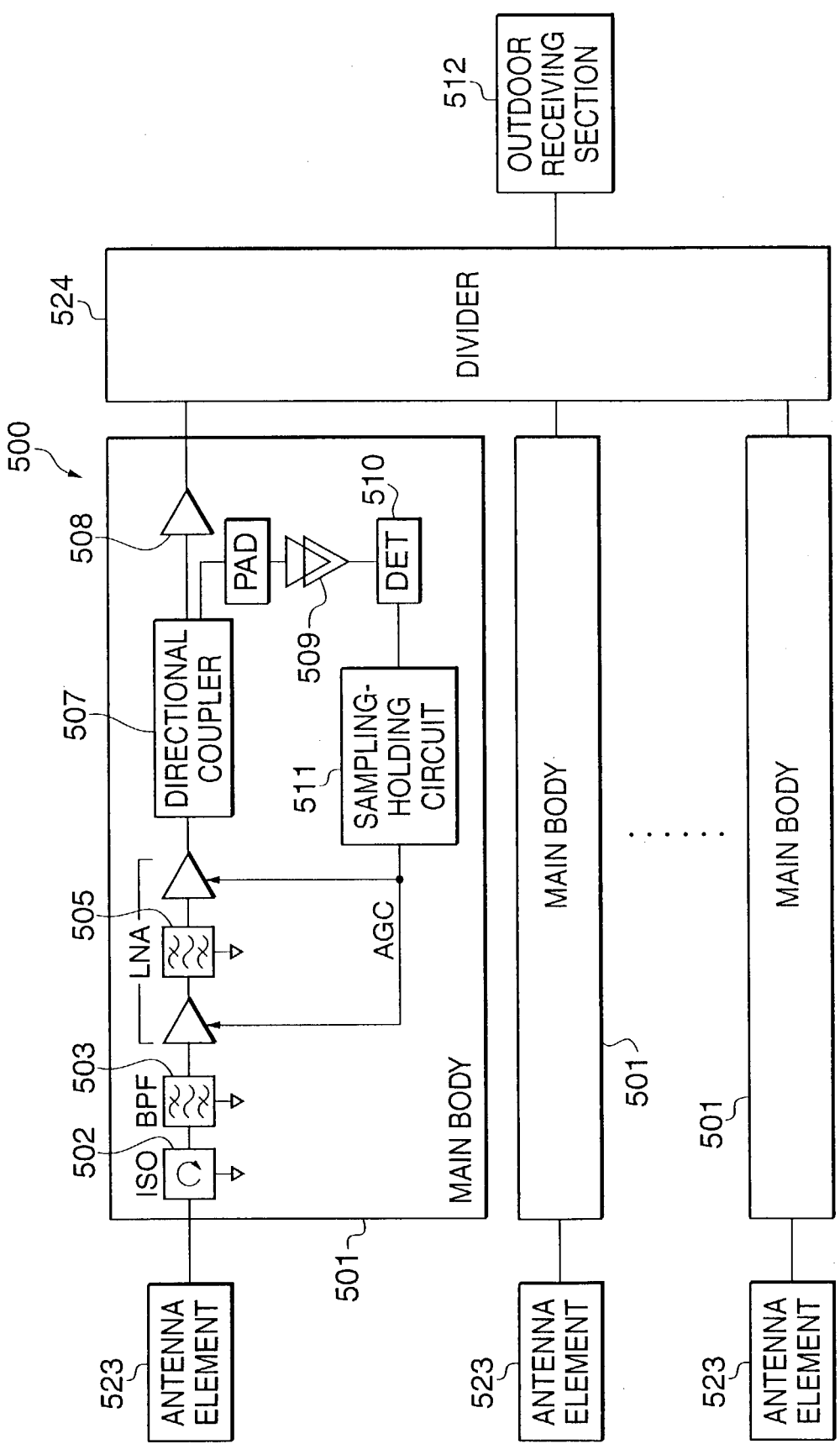
FIG. 19 is a block diagram showing a modified receiving antenna in the apparatus of the invention.
Figure 20:
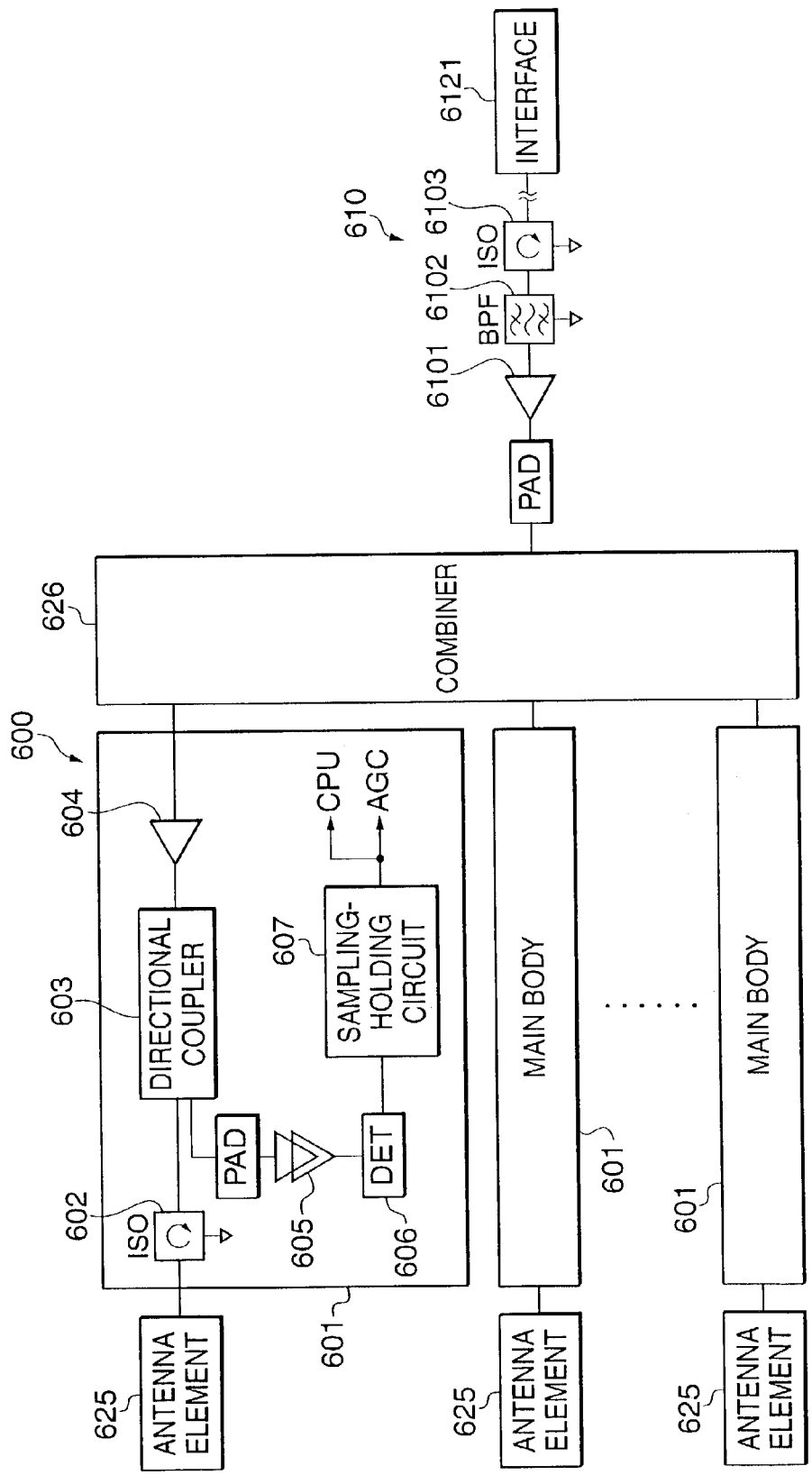
FIG. 20 is a block diagram showing a modified transmitting antenna in the apparatus of the invention.

FIG. 19 shows a receiving antenna 500 as another example of the aforementioned antenna 5. FIG. 20 shows a transmitting antenna 600 as another example of the aforementioned antenna 6.

The antenna 500 shown in FIG. 19 is provided with main bodies 501 corresponding to the antenna elements 523. The main body 501 includes an isolator (ISO) 502, a band-pass filter (BPF) 503, a low-noise amplifier (LNA) 505, a directional coupler 507, and an amplifier (AMP) 508. To the directional coupler 507, an amplifier (AMP) 509 and a detector (DET) 510 are connected. The detector 510 detects the RF outputted from the directional coupler 507 to derive the desired signal. The signal thus derived is encoded by a sampling-holding circuit 511 to maintain the signal level. A divider 524 is connected to the outdoor receiving section 512.

According to this embodiment, the relaying RF received can be transmitted to the receiving section with low noise by means of the low-noise amplifier (LNA) 505 corresponding to the relevant antenna element 523 in each main body 501.

The antenna 600 shown in FIG. 20 is provided with main bodies 601 corresponding to the antenna elements 625. The main body 601 includes an isolator (ISO) 602, a directional coupler 603, and an amplifier 604. The main bodies 601 are coupled by a combiner 626.

To the directional coupler 603, there are connected the amplifier (AMP) 605 and the detector (DET) 606. To the detector 606, a sampling-holding circuit 607 is connected. The sampling-holding circuit 607 are connected to the CPU and AGC. The combiner 626 for coupling the main bodies 601 is connected to an interface 6121 of the outdoor transmission section 610 through an amplifier (AMP) 6101, a band-pass filter (BPF) 6102 and an isolator (ISO) 6103.

In this embodiment, transmission efficiency can be improved by the sampling-holding circuit 607.

Figure 21:
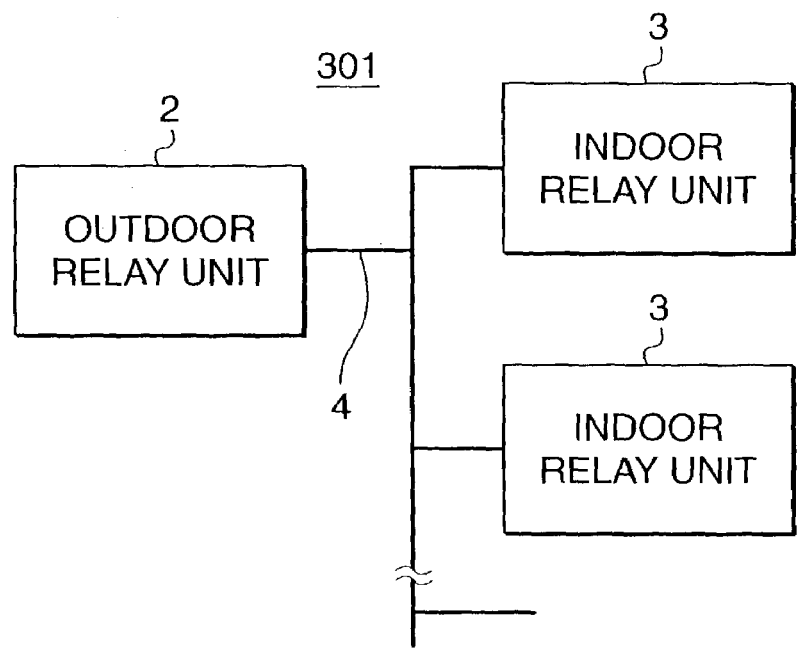
FIG. 21 is a block diagram schematically showing the system configuration of yet another embodiment of the apparatus according to the present invention.
Figure 22:
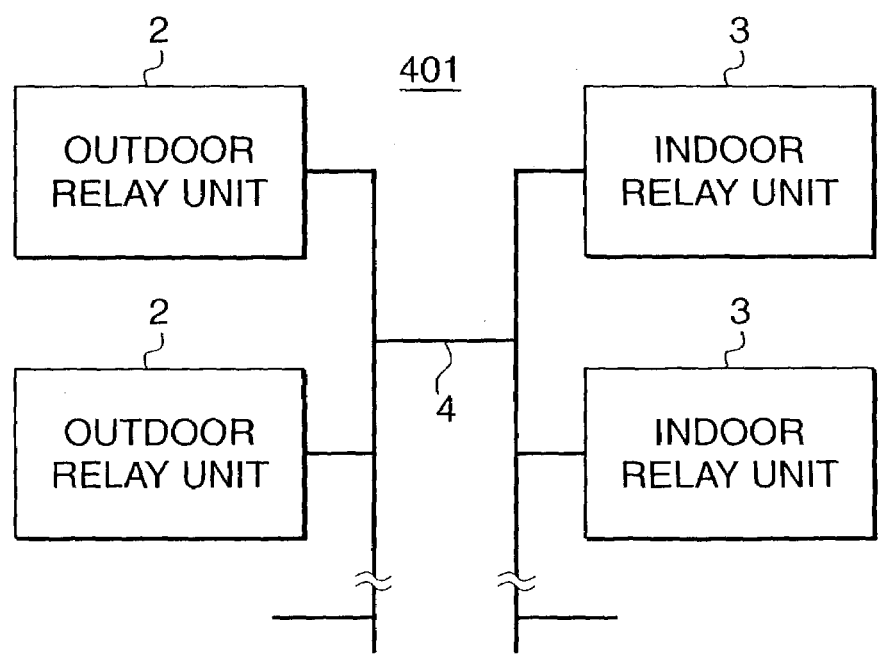
FIG. 22 is a block diagram schematically showing the system configuration of the other embodiment of the apparatus according to the present invention.

FIGS. 21 and 22 illustrate further embodiment of the radio relay apparatus according to the present invention.

In the radio relay apparatus 301 shown in FIG. 21, the transmission line 4 leading to the outdoor relay unit 2 is diverged into multiple lines for a plurality of indoor relay units 3. The radio relay apparatus 301 in this embodiment may be applied to a high rise building in such a manner that the outdoor relay unit 2 is set up on the building and the indoor relay units 3 are installed on every floor of the building by way of example. In this case, the relaying RF digital signal may be transmitted to each floor of the high rise building, while allocating optionally the communication channels for the respective floors, e.g. by allocating the first to third channels for a certain floor, and other channels for the other floors in the building.

The radio relay apparatus 401 shown in FIG. 22 has a plurality of outdoor relaying units 2 connected to a plurality of indoor relaying units 3 through digital transmission lines 4. By using the multiple outdoor relaying units 2, relaying RF signals can be received from all angles.

The radio relay apparatus 401 may be formed of a single indoor relay unit 3, but not necessarily requires a plurality of indoor relay units 3.

Thus, the radio relay apparatus according to the present invention enables polytomy multiple connection between the outdoor relay units 2 and the indoor rely units 3 in accordance with user environment.

The antennas in the radio relay apparatus of the invention are integrally incorporated in the first and second relay units so as to be connected to the first and second relay units without using a cable. Thus, the RF relaying with no transmission loss can be achieved, consequently to increase transmission efficiency, improve the noise figure on the receiving end, and heightening the receiving sensitivity.

The radio relay apparatus according to the invention, in which the high-frequency analog signal to be relayed is converted to its corresponding digital signal of the required frequency band by digitization and transmitted through the digital transmission line, brings about the following beneficial effects.

First, the radio relay apparatus of the invention makes it possible to count the number of users on the mobile ends.

Second, the radio relay apparatus of the invention makes use of a sensitive timing control (STC) circuit (not shown) incorporated in the digital signal processors 39 and 214a15, so that the gain can be controlled in accordance with the distance between the mobile terminal (mobile station) such as a cellular phone and the transmitting antennas 7 and 207 or receiving antennas 8 and 208. As a result, high-quality radio communication can be accomplished.

Third, the radio relay apparatus of the invention causes little oscillation, and therefore, makes it easy to carry out work for installing the transmission line, so that skilled professional engineer is not necessary for constructing the transmission line.

Fourth, the radio relay apparatus of the invention is tolerant of acoustic feedback (oscillation). This is because the isolation of the outdoor relay unit 2 and the indoor relay unit 3 can be controlled so as to make oscillation difficult.

Fifth, the radio relay apparatus of the invention enables burst transmission with an automatic level control (ALC) at a higher frequency band (or example, in the range of 800 MHz, 1500 MHz, etc.) To be more specific, the digital signal processor 39 shown in FIGS. 2 and 10 makes it possible to keep the output from the amplifier constant by controlling the attenuator (ATT). The same function of maintaining the output constant is practiced in the digital signal processor 89 in association with the attenuator (ATT) 83 in the embodiment shown in FIGS. 4 and 13.

Sixth, the radio relay apparatus of the invention enables burst transmission with an automatic gain control (AGC). To be more specific, the digital signal processor 39 can maintain the output constant by subjecting the attenuator (ATT) 33 to automatic gain control (AGC). The same function of maintaining the output constant is practiced in the digital signal processor 89 in association with the attenuator (ATT) 83 in the embodiment shown in FIGS. 4 and 13.

As is apparent from the foregoing description, the radio relay apparatus according to the present invention, which has the antennas integrally united with the respective relaying units, advantageously enjoys extremely higher transmission efficiency than a conventional relay apparatus adopting a coaxial cable for connecting the antennas with the relaying units. Besides, the apparatus of the invention enables its noise figure to be reduced on the receiving end. Since the radio relay apparatus according to the invention can perform digital signal transmission between the relaying units with digital signal processing for converting analog signals to digital signals, relaying RF signals can readily be controlled and managed.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A radio relay apparatus comprising a first relay unit equipped outdoors, a second relay unit equipped in a blind area, and a digital transmission line for connecting said first and second relay units to each other, said first relay unit being an outdoor relay unit including a receiving antenna for receiving an analog relaying signal in a high-frequency band from a base station, an outdoor receiving section integrally united with said receiving antenna for setting said relaying signal in a desired frequency band, and converting said relaying signal to a digital signal, a transmitting antenna for transmitting said relaying signal toward said base station, and an outdoor transmitting section integrally united with said transmitting antenna for converting said digital signal transmitted through said digital transmission line to an analog signal in a high-frequency band, said second relay unit comprising an indoor receiving section including a transmitting antenna for transmitting a relaying radio frequency signal toward a mobile station, said indoor receiving section being integrally united with said transmitting antenna and provided for converting said digital signal transmitted through said digital transmission line to an analog signal in a high-frequency band, and an indoor transmitting section including a receiving antenna for receiving said relaying radio frequency signal from said mobile station, said indoor transmitting section being integrally united with said receiving antenna and provided for setting said analog relaying signal in a desired frequency band, and converting said analog relaying signal to a digital signal, a transmitting antenna for transmitting said relaying signal toward said outdoor transmitting section, wherein said outdoor receiving section of said outdoor relay unit comprises a first receiving part and a second receiving part, said outdoor transmitting section comprises a third receiving part and a fourth receiving part, said indoor receiving section of said indoor relay unit comprises a third transmitting part and a fourth transmitting part, said indoor transmitting section comprises a first transmitting part and a section transmitting part, said first receiving unit being connected to said receiving antenna, said second receiving unit leading to said digital transmission line and including a plurality of divider receiving parts diverged from said first receiving unit through a divider, said divider receiving parts of said second receiving unit being provided for selecting different frequency bands, said third receiving unit leading to said digital transmission line and including a plurality of divider receiving parts, said divider receiving parts being connected to said fourth transmitting part through a combiner, said fourth transmitting unit being connected to said transmitting antenna, said third receiving unit having a plurality of divider receiving parts diverged from said digital transmission line through a divider and being connected to said fourth receiving unit through a divider, said fourth receiving unit being connected to said transmitting antenna, said first transmitting unit being connected to said receiving antenna, and said second transmitting unit having a plurality of divider transmitting parts diverged from said digital transmission line through a divider, said divider transmitting parts being allowed respectively for selecting different frequency bands and leading to said digital transmission line.

2. A radio relay apparatus as set forth in claim 1, wherein said outdoor receiving section includes a low-noise amplifier configured to amplify said relaying radio frequency signal received from said base station with low noise, and a digital processor configured to allow an analog frequency band signal to be converted to a digital frequency band signal and set in an arbitrary frequency band by digital processing, and said indoor receiving section includes a low-noise amplifier configured to amplify said relaying radio frequency signal received from said mobile station with low noise, and a digital processor configured to allow an analog frequency band signal to be converted to a digital frequency band signal and set in an arbitrary frequency band by digital processing.

3. A radio relay apparatus as set forth in claim 1, wherein said outdoor receiving section, outdoor transmitting section, indoor receiving section, and indoor transmitting section each include an amplifier and a sampling-holding circuit.

4. A radio relay apparatus as set forth in claim 1, wherein said high-frequency signal is in a range of frequency band used for a cellular phone.

* * * * *